United States Patent [19]
Ishii et al.

[11] Patent Number: 5,880,896
[45] Date of Patent: Mar. 9, 1999

[54] DEFORMABLE MIRROR

[75] Inventors: Yorishige Ishii, Yamatotakada; Hirotsugu Matoba, Sakurai; Susumu Hirata, Ikoma-gun; Shingo Abe, Tenri; Tetsuya Inui, Nara, all of Japan

[73] Assignee: Sharp Kabushiki Kaisha, Osaka, Japan

[21] Appl. No.: 905,946

[22] Filed: Aug. 5, 1997

[30] Foreign Application Priority Data

Aug. 9, 1996 [JP] Japan .................................. 8-211777

[51] Int. Cl.⁶ .............................. G02B 5/08; G02B 7/182; G02B 26/08
[52] U.S. Cl. ......................... 359/846; 359/224; 359/847
[58] Field of Search .................................. 359/846, 847, 359/849, 868, 869, 223, 224

[56] References Cited

U.S. PATENT DOCUMENTS

| | | | |
|---|---|---|---|
| 3,972,600 | 8/1976 | Cobarg | 359/840 |
| 4,288,146 | 9/1981 | Johnson, Jr. et al. | 359/847 |
| 5,202,875 | 4/1993 | Rosen et al. | 369/94 |
| 5,497,274 | 3/1996 | Soll et al. | 359/846 |

FOREIGN PATENT DOCUMENTS 5-151531  6/1993  Japan .

OTHER PUBLICATIONS

"Adaptive Optics for Optimization of Image Resolution", J.P. Gaffard, et al. *Applied Optics*, vol. 26, No. 18, pp 3772–3777, 1987.

*Primary Examiner*—Cassandra Spyrou
*Assistant Examiner*—Mark A. Robinson

[57] ABSTRACT

A deformable mirror including: a flexible member including a reflective surface for reflecting light incident thereupon; and a reference surface substrate including a support portion for supporting a peripheral portion of the flexible member, and a curved portion provided inside the support portion, the curved portion providing a space for allowing for the flexible member to be elastically deformed. A height of a central portion of the curved portion of the reference surface substrate is set to be equal to or less than a height of the support portion of the reference surface substrate. The flexible member is elastically deformed by being drawn toward the curved portion of the reference surface substrate, thereby giving a predetermined aberration to light incident upon the reflective surface of the flexible member.

13 Claims, 17 Drawing Sheets

— ■ — RMS value (μm)   — ● — PV value (μm)

PRIOR ART

PRIOR ART

DEFORMABLE MIRROR

BACKGROUND OF THE INVENTION

1. Field of the Invention

The present invention relates to a deformable mirror having a deformable reflective surface, and an optical apparatus and a recording/reproducing apparatus using the same. More particularly, the present invention relates to a deformable mirror enabling accurate recording and reproducing operations with respect to an optical disk including a substrate having an arbitrary thickness and a method for fabricating the same and an optical apparatus and a recording/reproducing apparatus using the same.

2. Description of the Related Art

In recent years, optical disks have been more and more frequently applied to a wide field of applications including audio and video apparatuses and computers, because a large number of information signals can be recorded on an optical disk with a high density. FIG. 15 is a schematic diagram showing an exemplary arrangement of an optical pickup applicable to such apparatuses. In the optical pickup 100 shown in FIG. 15, a light beam 103, emitted from a semiconductor laser device 101, is collimated by a collimator lens 102. After the collimated light beam 103 is incident upon a beam splitter 104, the light beam 103 goes straight through the beam splitter 104, passes through a quarter-wave plate 105 and is incident upon a reflective mirror 106. The optical path of the light beam 103 is bent so as to be incident onto an objective lens 107. The light incident onto the objective lens 107 is converged by the objective lens 107, so that a light spot 109 is formed on an information recording surface of an optical disk 108 supported by a rotational motor 113.

Next, the light beam 110, reflected by the optical disk 108, is returned to the objective lens 107 and passes through the objective lens 107, the reflective mirror 106 and the quarter-wave plate 105 and again is incident upon the beam splitter 104. The reflected light beam 110 is reflected by the polarizing beam splitter 104 because the light beam 110 has a polarization that is different from that of the light beam 103 because the light beam 110 has passed through the quarter-wave plate 105 twice. The reflected light beam 110 from the beam splitter 104 is converged by a converging lens 111 and then received by a photodetector 112. The photodetector 112 detects the intensity of the reflected light beam 110, thereby detecting a reproduced signal.

The objective lens 107 which is usable for an optical pickup having such an arrangement is generally designed in view of the thickness of the optical disk 108. However, in the case where one attempts to apply such an objective lens 107 to an optical disk 108 having a thickness different from the designed value, a spherical aberration is caused, so that the imaging ability thereof degrades and the recording and reproducing operations cannot be performed. In various kinds of conventional optical disks including a compact disk, a video disk and other disks applicable to a magneto-optical disk apparatus or the like conformable to an International Standardization Organization (ISO) standard, the thickness thereof has been set to be substantially the same value (i.e., about 1.2 mm). Thus, it has heretofore been possible for the same optical pickup to record and reproduce information onto/from different kinds of optical disks including a compact disk, a video disk and a magneto-optical disk.

However, in recent years, various kinds of methods have been newly designed for further increasing the recording density of an optical disk. For example, (1) a method for improving an optical resolution of an objective lens by increasing the numerical aperture (NA) thereof, and (2) a method in which multiple recording layers are provided have been proposed.

If the NA of an objective lens is increased in accordance with the method (1), the diameter of a converged beam is decreased in proportion thereto, then it becomes necessary to reduce the substrate thickness of a disk in order to realize approximately the same toleration for a disk skew. For example, if the NA of an objective lens is increased from about 0.5 to about 0.6, approximately the same toleration cannot be realized for a disk skew unless the substrate thickness of the disk is reduced from about 1.2 mm to about 0.6 mm.

However, in the case where the substrate thickness of a disk is reduced to such a value, if one attempts to record and reproduce information onto/from a conventional optical disk by using an objective lens corresponding to such an optical disk having a reduced substrate thickness, then the spherical aberration is increased and the light spot on the disk is adversely enlarged, so that it becomes difficult to perform recording and reproducing operations. As a result, since it is no longer possible to maintain a compatibility between such a thin disk and a conventional optical disk, two separate optical pickups must be used for recording and reproducing information onto/from a thin optical disk and a conventional optical disk, respectively.

On the other hand, in the case of using a multi-layer disk in which a plurality of recording layers are provided via a transparent substrate having a certain thickness in accordance with the method (2), the recording capacity per disk is considerably increased. However, since an optical pickup is required to deal with different distances from the objective lens to the respective recording layers, a single optical pickup cannot correctly record and reproduce information onto/from each recording layer in such a multi-layer disk.

As a method for solving such problems, a method for correcting a substrate thickness by using a deformable mirror is known from Japanese Laid-Open Patent Publication No. 5-151591. FIG. 16 is a schematic diagram showing an optical system of a disk apparatus using such a deformable mirror.

As shown in FIG. 16, the beam 103 emitted from the semiconductor laser device 101 passes through the collimator lens 102 to reach the beam splitter 104. The beam 103 has such a polarization that the beam splitter 104 allows the beam 103 to pass through. Thus, the beam 103 passes through the beam splitter 104 and the quarter-wave plate 105 and is incident upon a beam splitter 152. By passing through the quarter-wave plate 105, the polarization of the beam 103 is changed so that the beam 103 can pass through the beam splitter 152. Therefore, the beam 103 also passes through the beam splitter 152 to reach a quarter-wave plate 151.

After passing through the quarter-wave plate 151, the beam 103 reaches a deformable mirror 150. The deformable mirror 150 is a mirror having a deformable reflective surface. When an optical disk 108 having a larger substrate thickness is installed, the surface of the mirror 150 is deformed by a deformable mirror driver circuit 153, thereby applying a spherical aberration to the beam 103, which cancels the spherical aberration caused by the increase in the substrate thickness.

The beam 103, which has been reflected by the deformable mirror 150, returns through the quarter-wave plate 151 and is reflected by the beam splitter 152 to reach the objective lens 107. The light incident upon the objective lens 107 is converged by the objective lens 107 to form the light spot 109 on the surface of an information recording medium or the optical disk 108.

Then, the light beam 110 is reflected by the optical disk 108 and again passes through the objective lens 107 and is incident upon the beam splitter 152. The light beam 110 is reflected by the beam splitter 152 to pass through the quarter-wave plate 151 so that the polarization of the light beam 110 is changed due to the function of the quarter-wave plate 151. Then, the beam 110 is reflected by the deformable mirror 150 and passes through the quarter-wave plate 151 again to be incident upon the beam splitter 152. Since the polarization of the beam 110 is changed while passing through the quarter-wave plate 151, the beam 110 is transmitted by the beam splitter 152.

Then, the light beam 110 passes through the quarter-wave plate 105 and is incident upon the beam splitter 104. The light beam 110 is reflected by the beam splitter 104, converged by the converging lens 111 and then received by the photodetector 112. The photodetector 112 detects the intensity of the reflected light beam 110, thereby detecting a reproduced signal.

FIG. 17 illustrates a specific configuration of the deformable mirror 150 described in Japanese Laid-Open Patent Publication No. 5-151591 and "Adaptive Optics for Optimization of Image Resolution" (J. P. Gaffarel et al., Applied Optics, vol. 26, pp. 3772–3777, (1987)).

The deformable mirror 150 includes: a deformable plate 181 having a mirror surface 180 thereon; a plurality of piezoelectric actuators 182 pressing against the reverse surface of the deformable plate 181 at several points; and a base substrate on which the deformable plate 181 and the piezoelectric actuators 182 are fixed. By varying a voltage to be applied to the respective piezoelectric actuators 182, the surface of the deformable plate 181 can be displaced by a desired amount, so that the mirror surface 180 of the deformable plate 181 can be deformed into a desired shape.

However, in a conventional deformable mirror using the piezoelectric actuators 182 such as that shown in FIG. 17, whenever the driving voltage is varied, the displacement of the deformable plate 181 is also varied. Particularly, when a variation is caused among the voltages of the piezoelectric actuators 182, the shape of the deformable mirror surface 180 deviates substantially from its desired shape.

In addition, the pressing force of the respective piezoelectric actuators 182 also varies because of thermal expansion caused by the variation in the ambient temperature, so that the shape of the deformable mirror surface 180 adversely deviates from its desired shape.

Furthermore, since the diameter of a light beam, which is subjected to the aberration correction, is about 4 mm, a large number of piezoelectric actuators 182 are required to be provided so as to correspond to one light beam having a diameter of about 4 mm for deforming the deformable mirror into a correct shape. As a result, the assembly process for such a deformable mirror becomes adversely complicated and the size of the entire deformable mirror or the optical pickup is disadvantageously increased because a large number of piezoelectric actuators 182 are required to be fixed and the wiring is required to be extended a longer distance.

SUMMARY OF THE INVENTION

According to one aspect of this invention, a deformable mirror includes a flexible member including a reflective surface for reflecting light incident thereupon; and a reference surface substrate including a support portion for supporting a peripheral portion of the flexible member, and a curved portion provided inside the support portion, the curved portion providing a space for allowing for the flexible member to be elastically deformed. A height of a central portion of the curved portion of the reference surface substrate is set to be equal to or less than a height of the support portion of the reference surface substrate. The flexible member is elastically deformed by being drawn toward the curved portion of the reference surface substrate, thereby giving a predetermined aberration to light incident upon the reflective surface of the flexible member.

In the deformable mirror having such a configuration, the reflective surface of the flexible member is deformed in accordance with the curved portion of the reference surface substrate. Therefore, by maintaining the form accuracy of the curved portion high, the deformed shape of the reflective surface can be accurately determined so that an accurate aberration compensation is achieved.

The curved portion of the reference surface substrate may be of any shape as long as a predetermined aberration can be compensated. Since the height of the central portion of the curved portion is set to be equal to or less than that of the support portion around the central portion, the central portion never protrudes upwards beyond the periphery of the support portion. Therefore, the flexible member does not come into contact with the central portion, so that the reflective surface of the flexible member may form and serve as a plane mirror when the flexible member is not being deformed. As a result, it is possible to establish both a plane mirror state (for not generating an aberration) and a deformed mirror state (for generating an aberration for aberration compensation). This enables an optical apparatus or a recording/reproducing apparatus incorporating such a deformable mirror (such apparatuses will be later described in more detail) to accurately record/reproduce information onto/from two types of optical disks being different from each other in thickness.

In one embodiment of the invention, the curved portion of the reference surface substrate may include a central convex portion provided around a center of the curved portion; a ring-shaped concave portion surrounding the central convex portion; and a transition portion extending from the ring-shaped concave portion to the support portion of the reference surface substrate.

When the curved portion of the reference surface substrate is formed to have such a configuration, the amount by which the flexible member is deformed can be reduced.

In another embodiment of the invention, where r1 denotes a radius of a first region of the curved portion which corresponds to a periphery of the curved portion, r2 denotes a radius of a second region of the curved portion in which, as the flexible member is being drawn toward the curved portion, a predetermined aberration is reliably given to light incident upon the reflective surface of the flexible member, and r3 denotes a radius of a third region of the curved portion which is designed to, as the flexible member is being drawn toward the curved portion, give the predetermined aberration to light incident upon the reflective surface of the flexible member, then, an expression: r1>r3>r2 is satisfied.

In such a configuration, the peripheral portion of the curved portion present outside the third region (which is designed to give a predetermined aberration to the light incident upon the reflective surface of the flexible member) may be shaped so as to facilitate the deformation of the flexible member. Therefore, the amount of energy required for deforming the flexible member can be reduced.

The flexible member of the deformable mirror can be deformed by, for example, providing the flexible member with an upper electrode layer while providing the reference surface substrate with a lower electrode layer, and applying a voltage between the electrodes. Thus, the flexible member is elastically deformed by virtue of the static electricity generated between the electrodes. By shaping the peripheral portion of the flexible member so as to facilitate the deformation, the amount of energy (i.e., voltage) required for elastically deforming the flexible member can be reduced. As a result, the running cost of the optical apparatus or the recording/reproducing apparatus can be reduced.

In still another embodiment of the invention, the first region of the curved portion is differentiable.

In such a case, since the curved portion of the reference surface substrate has a smooth and continuous curved surface, it is possible to improve the deformation characteristics of the flexible member, which is elastically deformed in accordance with such a curved surface, while no excessive stress is generated locally when the flexible member is being deformed. Thus, the amount of energy required for elastically deforming the flexible member can be reduced, as well as the life of the flexible member may be prolonged while the reliability of the optical apparatus or the recording/reproducing apparatus may also be enhanced.

In still another embodiment of the invention, a cross section of the first region of the curved portion is linearly symmetrical about a symmetry axis extending vertically through a point at a distance of (r1)/2 from a center of the curved portion.

Also in such a case, the flexible member can be deformed smoothly. As a result, when such a deformable mirror is incorporated into an optical apparatus or a recording/reproducing apparatus, the running cost thereof can be reduced.

In still another embodiment of the invention, a cross section of the first region of the curved portion excluding the third region is differentiable while the cross section of the first region is an arc.

Also in such a case, the flexible member can be deformed smoothly while no excessive stress is generated locally when the flexible member is being deformed. Such a deformable mirror, when incorporated into an optical apparatus or a recording/reproducing apparatus, may contribute to reducing the running cost of the apparatus.

In still another embodiment of the invention, a cross section of the first region of the curved portion has a radius of curvature R which falls within ±20% of a value expressed by Expression (2)

$$R=\{(r1-r3)^2+d^2\}/(2d) \qquad (2),$$

where d denotes a depth of the curved portion at its deepest point.

Also in such a case, the flexible member can be deformed smoothly while no excessive stress is generated locally when the flexible member is being deformed. Such a deformable mirror, when incorporated into an optical apparatus or a recording/reproducing apparatus, may contribute to reducing the running cost of the apparatus.

In still another embodiment of the invention, the flexible member is formed of a material containing at least one of Ni and Si.

This improves the deformation characteristics of the flexible member.

According to another aspect of this invention, an optical apparatus includes: a deformable mirror including a deformable reflective surface; and an optical element for inputting/outputting to/from the deformable mirror, the optical apparatus generating optically different light beams depending upon whether the deformable mirror is being deformed or not. The deformable mirror includes: a flexible member including a reflective surface for reflecting light incident thereupon; and a reference surface substrate including a support portion for supporting a peripheral portion of the flexible member, and a curved portion provided inside the support portion, the curved portion providing a space for allowing for the flexible member to be elastically deformed. A height of a central portion of the curved portion of the reference surface substrate is set to be equal to or less than a height of the support portion of the reference surface substrate. The flexible member is elastically deformed by being drawn toward the curved portion of the reference surface substrate, thereby giving a predetermined aberration to light incident upon the reflective surface of the flexible member.

The optical apparatus having such a configuration is capable of selectively establishing two different states: a state where the reflective surface of the flexible member is maintained planar or flat, thereby giving no aberration to light incident upon the reflective surface; and a state where the flexible member is elastically deformed by being drawn toward the curved portion of the reference surface substrate, thereby giving a predetermined aberration to light incident upon the reflective surface. Thus, the optical apparatus is capable of generating optically different light beams.

The deformable mirror incorporated in the optical apparatus is similar as that described above. Thus, there are similarly provided the various advantages described above.

According to still another aspect of this invention, a recording/reproducing apparatus includes: a laser light source; a deformable mirror including a reflective surface for reflecting laser light from the laser light source, the deformable mirror giving a spherical aberration to the laser light by deforming the reflective surface; an objective lens for focusing the laser light reflected by the deformable mirror onto either one of first and second optical recording media which are different from each other in thickness; and a driver for deforming the reflective surface of the flexible member. The driver does not deform the reflective surface of the flexible member when the laser light is to be focused onto the first optical recording medium. The driver deforms the reflective surface of the flexible member when the laser light is to be focused onto the second optical recording medium. The deformable mirror includes: a flexible member including a reflective surface for reflecting light incident thereupon; and a reference surface substrate including a support portion for supporting a peripheral portion of the flexible member, and a curved portion provided inside the support portion, the curved portion providing a space for allowing for the flexible member to be elastically deformed. A height of a central portion of the curved portion of the reference surface substrate is set to be equal to or less than a height of the support portion of the reference surface substrate. The flexible member is elastically deformed by being drawn toward the curved portion of the reference surface substrate, thereby giving a predetermined aberration to light incident upon the reflective surface of the flexible member.

The recording/reproducing apparatus having such a configuration is capable of selectively establishing two different states: a state where the reflective surface of the flexible member is maintained planar or flat, thereby giving no aberration to light incident upon the reflective surface; and a state where the flexible member is elastically deformed by being drawn toward the curved portion of the reference surface substrate, thereby giving a predetermined aberration to light incident upon the reflective surface. Thus, the recording/reproducing apparatus is capable of focusing a laser light onto either one of first and second optical recording media which are different from each other in thickness, thereby properly recording/reproducing information onto/from such optical media.

The deformable mirror incorporated in the recording/reproducing apparatus is similar as that described above. Thus, there are similarly provided the various advantages described above.

Thus, the invention described herein makes possible the advantages of: (1) providing a deformable mirror which is insensitive to variations in the ambient temperature and the electric circuit, capable of accurately deforming the reflective surface and accurately maintaining the deformed shape of the reflective surface, having a compact and simple configuration, and can be fabricated at a low cost, while no excessive stress is generated locally onto the flexible member, thereby having a long life; (2) providing an optical apparatus incorporating such a deformable mirror and thereby having a reduced running cost; and (3) providing an recording/reproducing apparatus incorporating such a deformable mirror and thereby having a reduced running cost.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of an illustrative example with reference to the accompanying figures.

Figure 1:
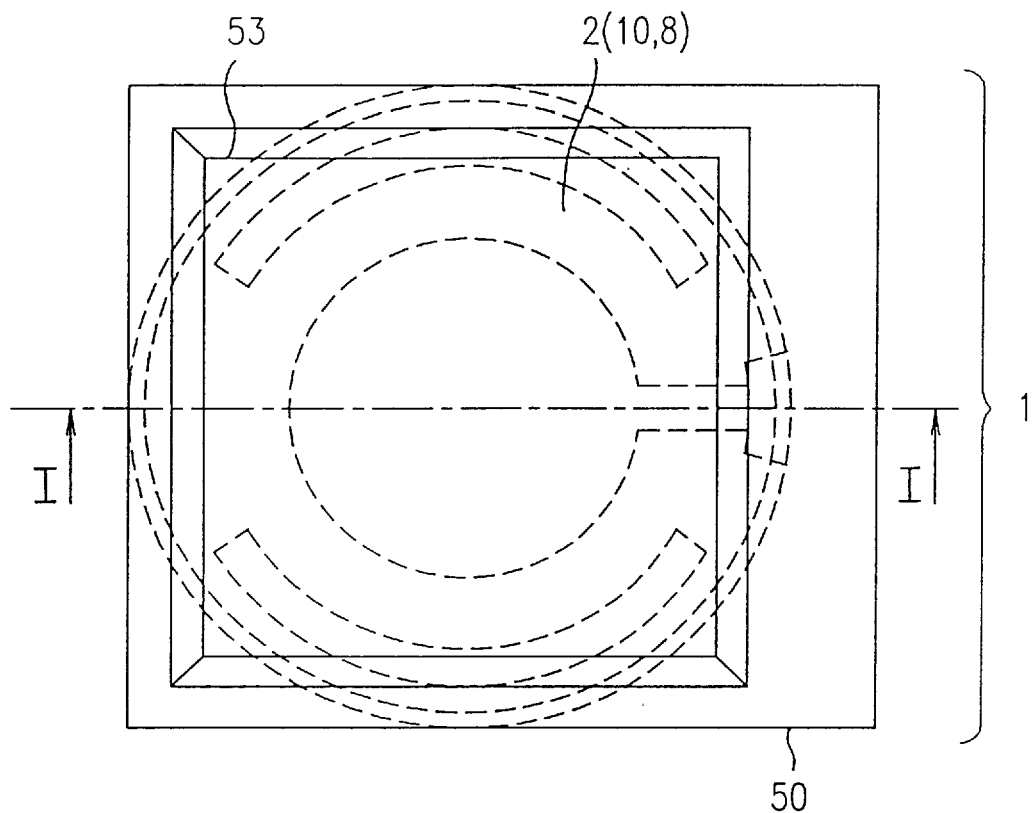
FIG. 1 is a plan view illustrating a deformable mirror according to an example of the present invention.
Figure 2:
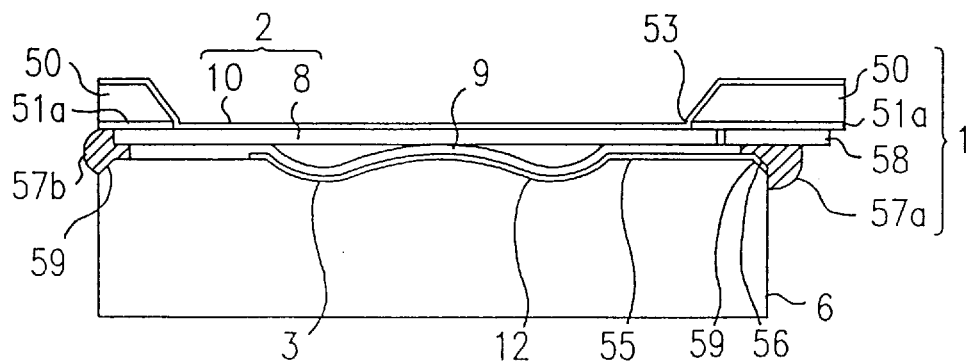
FIG. 2 is a cross-sectional view illustrating the deformable mirror shown in FIG. 1 taken along the line I—I in FIG. 1.
Figure 3:
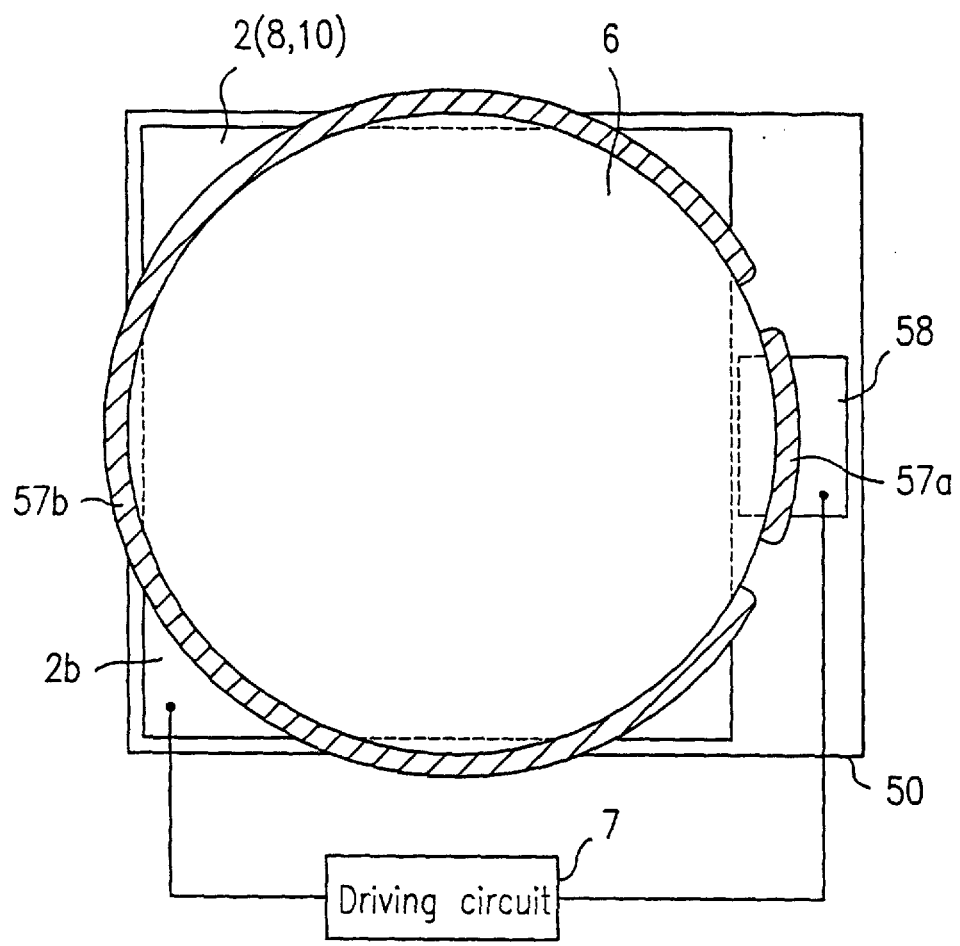
FIG. 3 is a bottom view illustrating the deformable mirror shown in FIG. 1.
Figure 4:
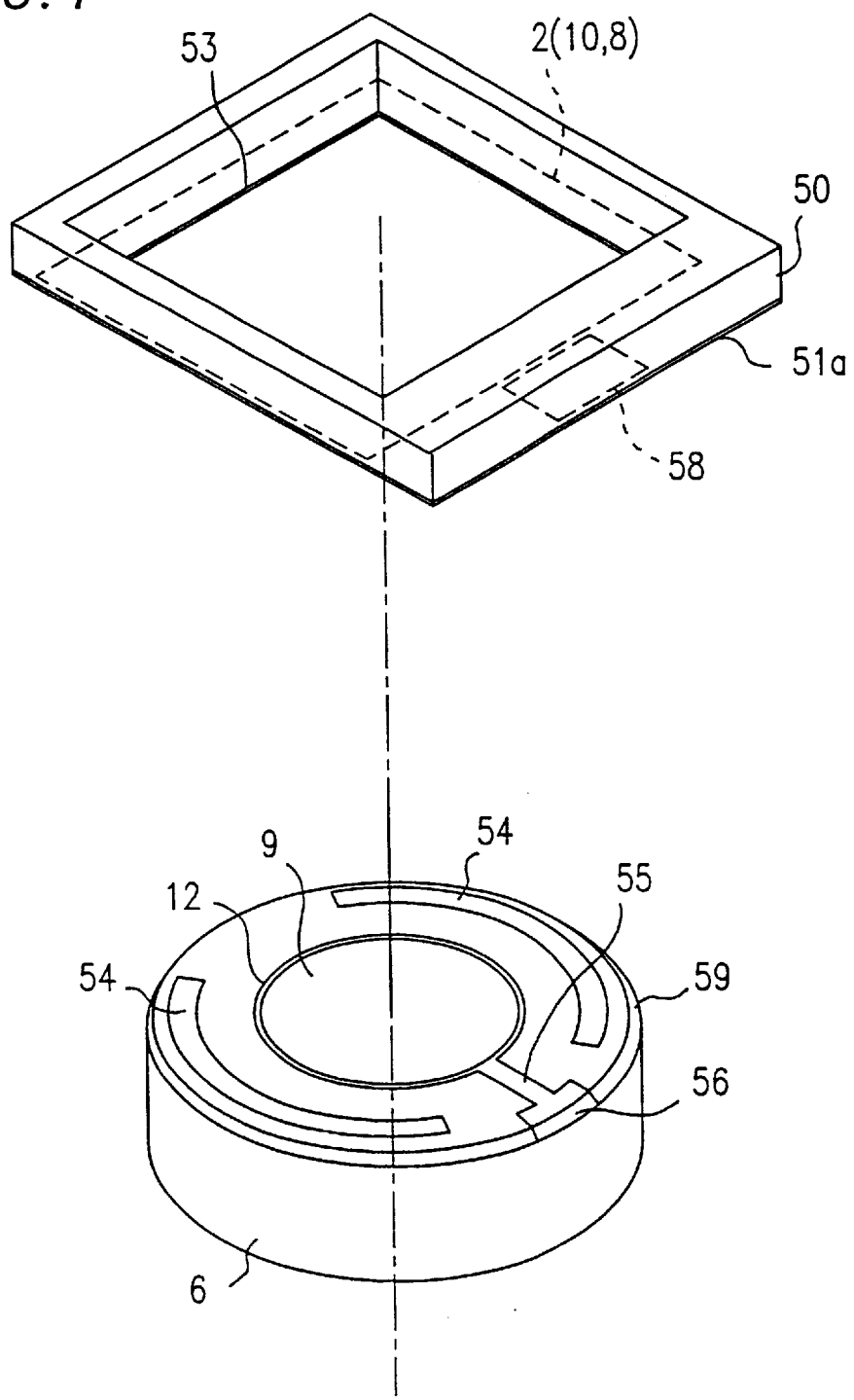
FIG. 4 is an exploded isometric view illustrating the deformable mirror shown in FIG. 1.

A deformable mirror 1 according to the example of the present invention is illustrated in FIGS. 1 to 4. More particularly, FIG. 1 is a plan view illustrating the deformable mirror 1 of the present example; FIG. 2 is a cross-sectional view illustrating the deformable mirror 1 taken along the line I—I in FIG. 1; FIG. 3 is a bottom view illustrating the deformable mirror 1; and FIG. 4 is an exploded isometric view illustrating the deformable mirror 1.

The deformable mirror 1 includes a silicon substrate 50, a flexible member 2 attached to the reverse surface of the silicon substrate 50, and a reference surface substrate 6 (i.e., a substrate having a reference surface) provided under the flexible member 2. The silicon substrate 50 includes a square-shaped opening 53 provided therein. The center of the opening 53 is slightly displaced from the geometrical center of the silicon substrate 50 toward the left (in FIG. 1) corner of the silicon substrate 50.

As shown in FIG. 4, the flexible member 2 (illustrated as a large square in dashed line) is square-shaped and is slightly larger than the opening 53. The peripheral portion of the flexible member 2 is fixed to a flat support surface of the silicon substrate 50. More particularly, the flexible member 2 is fixed to the support surface of the silicon substrate 50 via a thermally oxidized silicon film 51a. Furthermore, a tensile stress is being applied to the flexible member 2 while the flexible member 2 is fixed to the silicon substrate 50.

As shown in FIG. 2, the flexible member 2 includes an upper electrode layer 8 and a reflective film 10 deposited on the upper electrode layer 8. The upper electrode layer 8 is formed of, for example, an Ni film having a thickness of about 8 μm. The reflective film 10 is formed of, for example, a thin film of Au, Al or the like having a thickness of about 1 μm.

It is possible not to provide the reflective film 10 and instead to use the surface of the upper electrode layer 8 itself as a reflective surface. This is advantageous in that parts count can be reduced and thereby contributing to lowering the manufacturing cost.

The reference surface substrate 6 is cylindrically-shaped, as shown in FIG. 4, and is produced through, for example, the glass molding method. A lower electrode layer 12, a wiring portion 55, a wiring pad 56 and spacer layers 54 are provided on the upper side of the reference surface substrate 6 facing the flexible member 2. The insulating layer 9 is provided so as to cover at least the lower electrode layer 12 and the wiring portion 55 (see FIG. 2). The lower electrode layer 12, the wiring portion 55 and the wiring pad 56 are formed as a continuous member.

As shown in FIG. 2, the reference surface substrate 6 includes a ring-shaped flat support surface provided in the peripheral portion of the upper surface of the reference surface substrate 6. The reference surface substrate 6 includes an "uneven" (e.g., curved or corrugated) portion 3 inside the ring-shaped support surface. The lower electrode layer 12 is provided so as to correspond to the uneven portion 3. Moreover, a chamfered portion 59 is provided around the periphery of the support surface. The wiring portion 55 is provided on the support surface. The wiring pad 56 is provided on the chamfered portion 59. The insulating layer 9 is not provided on the chamfered portion 59. Therefore, the insulating layer 9 is not in contact with the wiring pad 56 on the chamfered portion 59 (see FIG. 2).

The lower electrode layer 12 and the spacer layers 54 are each formed of, for example, a thin film of Al having a thickness of about 1 μm. The insulating layer 9 is formed of, for example, an oxide silicon film having a thickness of about 1 μm.

The wiring pad 56 is provided for establishing an electrical connection between the wiring portion 55 for applying a voltage to the lower electrode layer 12 and a lower electrode pad 58 (to be later described in detail). The wiring portion 55 and the wiring pad 56 are formed of the same material so as to have substantially the same thickness.

The silicon substrate 50 and the reference surface substrate 6 are attached together with an adhesive so as to adhere to each other in such a manner that the upper electrode layer 8 of the silicon substrate 50 faces the lower electrode layer 12 of the reference surface substrate 6 (see FIG. 2). More particularly, the silicon substrate 50 and the reference surface substrate 6 are attached together so that the respective flat support surfaces come into close contact with each other. The flexible member 2 can maintain its flat surface by being in contact with a portion of the upper surface of the insulating layer 9 over the spacer layers 54 at the same height as it is in contact with another portion of the insulating layer 9 over the wiring portion 55.

The above-mentioned adhesive may be, for example, an epoxy type adhesive having an electrical conductivity. As shown in FIG. 2, the silicon substrate 50 and the reference surface substrate 6 are secured to each other via adhesives 57a and 57b. As shown in FIG. 2, the adhesive 57a also functions as a member for establishing an electrical connection between the wiring pad 56, which is provided on the chamfered portion 59 of the reference surface substrate 6, and the lower electrode pad 58, which is provided, via the thermally oxidized silicon film 51a, on the reverse surface of the silicon substrate 50.

The chamfered portion 59 of the reference surface substrate 6 has the following functions. That is, due to the presence of the chamfered portion 59, the wiring pad 56 is exposed when the silicon substrate 50 and the reference surface substrate 6 are attached together. Moreover, the adhesives 57a and 57b may get into a space provided by the chamfered portion 59, thereby enhancing the reliability of the adhesion and insuring the electrical connection between the wiring pad 56 and the lower electrode pad 58.

An exposed portion 2b of the flexible member 2 (see FIG. 3) and the lower electrode pad 58 are connected to a driving circuit 7 by means of soldering or the like. The driving circuit 7 functions to start/stop applying a voltage between the exposed portion 2b of the flexible member 2 and the lower electrode layer 12.

More particularly, in order to reflect a light beam incident upon the reflective film 10 of the flexible member 2 without giving an aberration (a spherical aberration) to the light beam, no voltage is applied by the driving circuit 7. In such a case, the flexible member 2 maintains the reflective surface 10 thereof flat by virtue of the tensile stress being applied thereto. As a result, the flexible member 2 reflects the light beam incident thereupon while giving no aberration to the light beam. In order to give an aberration to an incident light beam, the driving circuit 7 applies a voltage between the upper electrode layer 8 and the lower electrode layer 12 so as to apply an electrostatic stress therebetween. The electrostatic stress causes the flexible member 2 to be drawn toward the uneven surface 3, thereby varying the reflective surface 10 of the flexible member 2 so as to give a predetermined aberration to the light beam incident thereupon.

Figure 5:
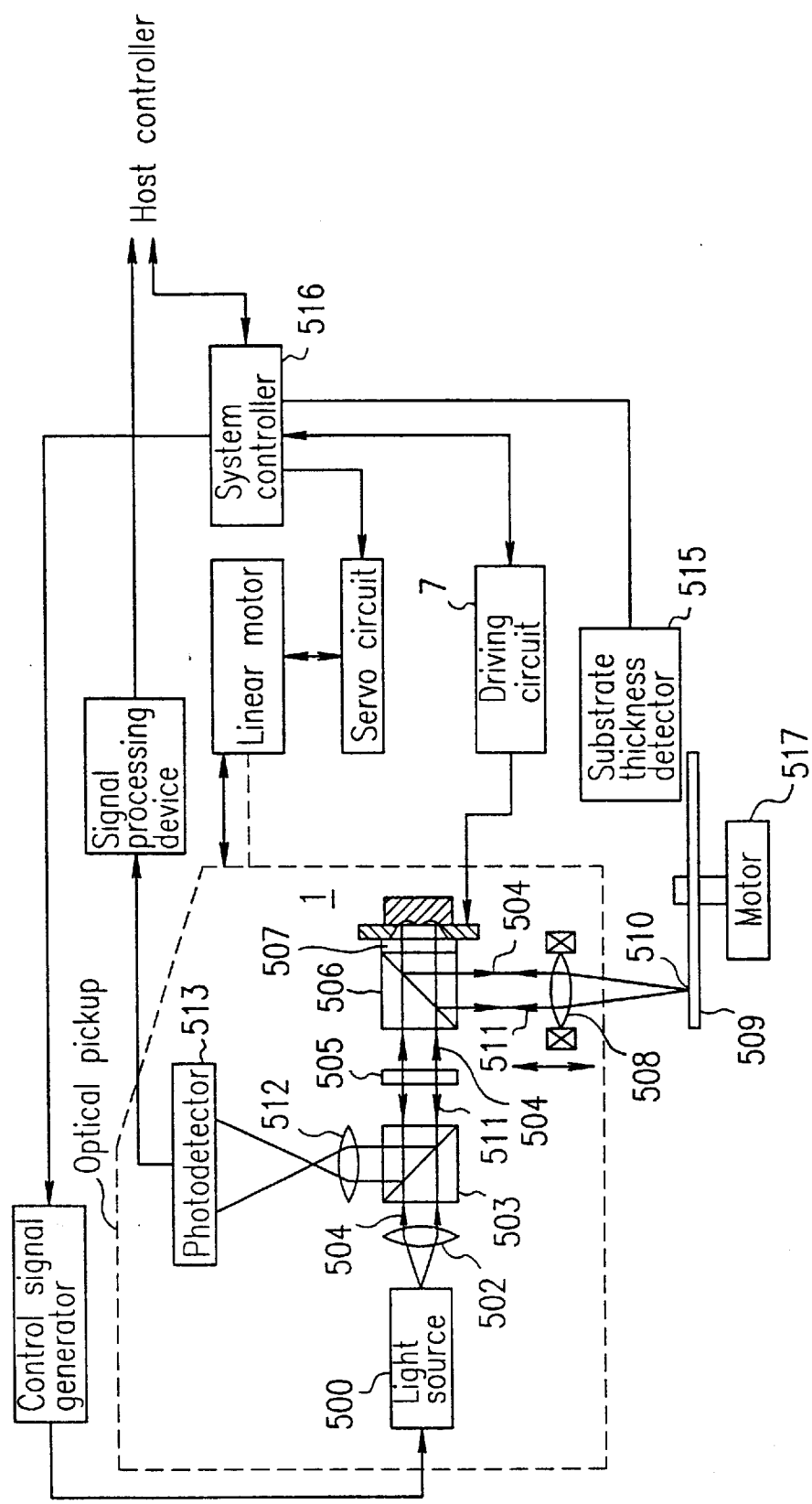
FIG. 5 is a block diagram illustrating a configuration of an exemplary recording/reproducing apparatus incorporating the deformable mirror shown in FIG. 1.

FIG. 5 illustrates an exemplary recording/reproducing apparatus according to the present invention. The recording/reproducing apparatus of the present example, incorporating the deformable mirror 1 illustrated in FIGS. 1 to 4, is capable of recording/reproducing information onto/from two types of optical disks different from each other in thickness.

In the following description, a recording/reproducing apparatus which can be used for two different types of optical disks respectively having thicknesses of about 0.6 mm (e.g., a DVD) and about 1.2 mm (e.g., a CD) will be described.

A light beam 504 is emitted from a semiconductor laser 500 being a light source of an optical pickup of the apparatus. The light beam 504 passes through a collimator lens 502, a beam splitter 503 and a quarter-wave plate 505 to reach a beam splitter 506. The light beam 504 passes through the beam splitter 506 and a quarter-wave plate 507 to reach the deformable mirror 1.

The light beam 504 is reflected by the deformable mirror 1, and the reflected light again passes through the quarter-wave plate 507 and is then reflected by the beam splitter 506 to be incident upon an objective lens 508. The light beam is focused by the objective lens 508 to irradiate an optical disk 509. The focal distance and the numerical aperture (NA) of the objective lens 508 are set for a 0.6 mm-thick optical disk.

It is noted that the recording/reproducing apparatus of the present example is capable of accurately performing a recording/reproducing operation onto/from both a 1.2 mm-thick optical disk and a 0.6 mm-thick optical disk. This is achieved by altering or switching the state of the deformable mirror 1 according to the thickness of the optical disk 509 actually mounted. That is, the flexible member 2 of the deformable mirror 1 is altered in shape so as to displace or move the light spot of the light beam after passing through the objective lens 508, thereby forming the light spot properly on the optical disk 509 which is actually mounted on and supported by a driving motor 517.

More particularly, the flexible member 2 of the deformable mirror 1 is deformed when the disk mounted is 1.2 mm thick, so as to give an aberration to the light incident upon the objective lens 508. Thus, the light spot of the light beam from the objective lens 508 is formed properly on the 1.2 mm optical disk 509 while information is being recorded/reproduced onto/from the optical disk 509.

When the disk mounted is 0.6 mm thick, the flexible member 2 of the deformable mirror 1 is not deformed so as to form a plane mirror, thereby not giving an aberration to the light incident upon the objective lens 508. Thus, the light spot of the light beam from the objective lens 508 is formed properly on the 0.6 mm optical disk 509 while information is being recorded/reproduced onto/from the optical disk 509.

Therefore, it is necessary to detect the thickness of the optical disk 509 before the flexible member 2 of the deformable mirror 1 is deformed. The thickness detection is performed by a thickness detector (or a substrate thickness detector) 515 provided above the optical disk 509.

Figure 6:
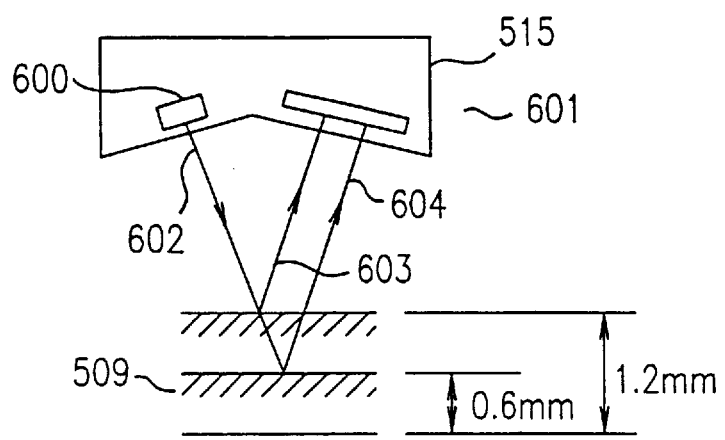
FIG. 6 is a schematic diagram for illustrating the principle of thickness detection utilized in a thickness detector of the recording/reproducing apparatus shown in FIG. 5.

An exemplary configuration of the thickness detector 515 is illustrated in FIG. 6. A light beam 602 is emitted from the light source 600 toward the optical disk 509 and is reflected by the surface of the optical disk 509. When the optical disk 509 is 0.6 mm thick, the reflected light travels along a light path 604 to be incident upon a photodetector 601. When the optical disk 509 is 1.2 mm thick, the reflected light travels along a different light path 603 to be incident upon a photodetector 601. The photodetector 601 detects the location at which the reflected light is incident upon the photodetector 601, thus determining the thickness of the optical disk 509. The detection result, i.e., the thickness information of the optical disk is transmitted to a system controller 516. Receiving the information, the system controller 516 acts to deform the deformable mirror 1 in the following manner.

When the optical disk 509 is 0.6 mm thick, since the aberration compensation is not necessary for such a disk, the system controller 516 does not activate the driving circuit 7. In such a case, the flexible member 2 of the deformable mirror 1 is not deformed, and the reflective surface 10 thereof functions as a plane mirror.

When the optical disk 509 is 1.2 mm thick, the system controller 516 activates the driving circuit 7 to cause the flexible member 2 of the deformable mirror 1 to be drawn toward the uneven surface 3 of the reference surface substrate 6, thereby deforming the flexible member 2. Thus, a predetermined aberration is given to the light beam as the light beam is reflected by the deformable mirror 1 so that the light spot of the light beam from the objective lens 508 is formed properly on the 1.2 mm optical disk 509.

Although, in the present example, the deformable mirror 1 is deformed for aberration compensation when the optical disk 509 used is 1.2 mm thick, it is also possible to deform the deformable mirror 1 when the optical disk 509 used is 0.6 mm thick.

It should be noted, however, that since a 0.6 mm optical disk has a large storage capacity, it accordingly requires the optical element to have a relatively high accuracy in reproducing the optical disk than the accuracy required to reproduce a 1.2 mm optical disk such as a CD. A simulation conducted by the inventors of the present invention has confirmed that the accuracy requirement for the optical element is less strict in the case where an aberration is given to the light beam when recording/reproducing onto/from a 1.2 mm optical disk. Thus, it is practically more preferable to form the reflective film 10 of the deformable mirror 1 into a plane mirror for recording/reproducing information onto/from a 0.6 mm optical disk, and to deform the flexible member 2 of the deformable mirror 1 for recording/reproducing information onto/from a 1.2 mm optical disk.

Next, referring to FIGS. 7 and 8, possible cross sections (possible curved surfaces) of the uneven surface 3 of the reference surface substrate 6 (for deforming the reflective surface of the deformable mirror 1, i.e., the reflective film 10 of the flexible member 2) will be described.

The uneven surface 3 may have any cross section as long as a predetermined aberration is generated by the reflective surface of the flexible member 2, when being deformed in accordance with the curved surface of the uneven surface 3.

Figure 7:
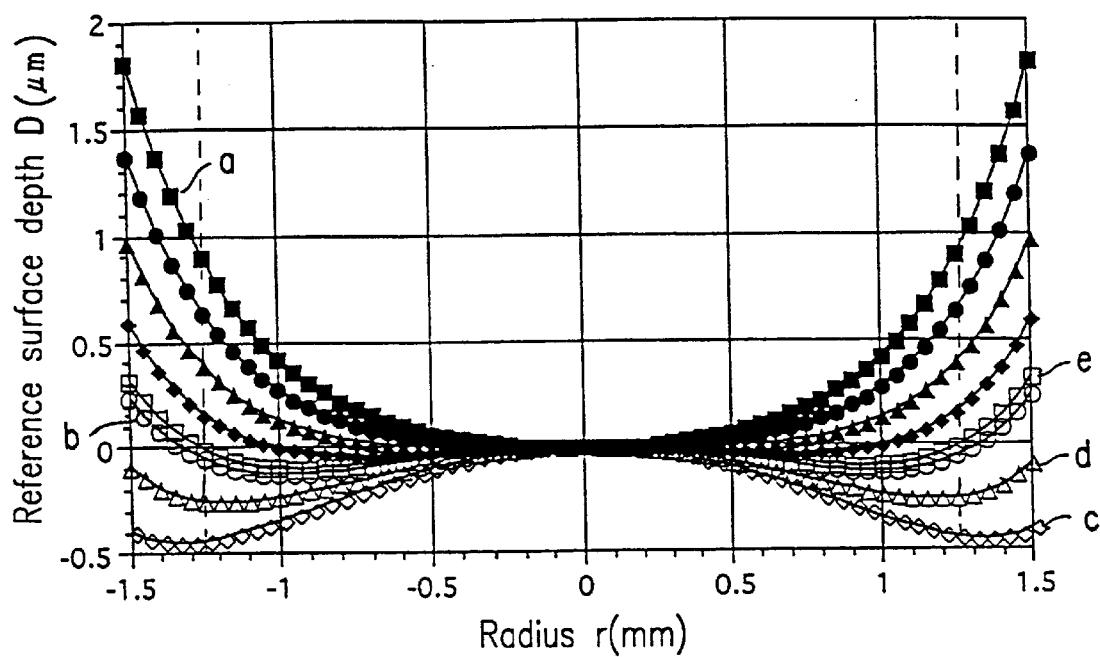
FIG. 7 is a graph illustrating possible curves for the cross section of the reference surface substrate of the deformable mirror shown in FIG. 1, the curves having been obtained through a simulation.

FIG. 7 shows a number of possible cross sections of the uneven surface 3, which are obtained by the simulation. When the reflective film 10 of the deformable mirror 1 functions as a plane mirror, the cross-section of the reflected film 10 can be represented by a horizontal line at D (depth) =0 ($\mu$m) in FIG. 7. On the other hand, when the reflective film 10 of the deformable mirror 1 functions as a mirror for compensating an aberration, the reflective film 10 takes a cross section which substantially corresponds to the cross section of the uneven surface 3, which is represented by one of the curves shown in FIG. 7.

Assume that the focal distance of the objective lens 508 be, for example, 3.3 mm, and the NA thereof be, for example, 0.45. Then, the light beam will irradiate an area encompassed by a radius of about (3.3×0.45 mm =) 1.5 mm. In such a case, the reflective surface of the deformable mirror 1 should occupy or cover that area so that an aberration can be compensated in the area.

However, not all of the curves (or cross sections) shown in FIG. 7 are practically usable. Particularly, the curves denoted by a, b and c in FIG. 7 will be discussed now, referring also to FIGS. 8A to 8C.

Figure 8A:
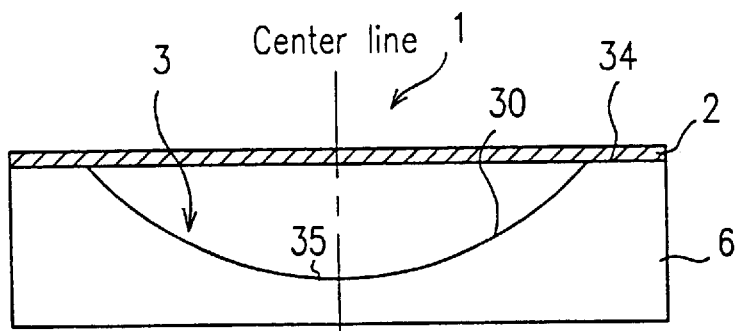
FIGS. 8A and 8B each show a cross section of the deformable mirror of the present invention.

FIG. 8A illustrates the deformable mirror 1 in which the uneven surface 3 of the reference surface substrate 6 is formed in accordance with one of the curves shown in FIG. 7 where the support surface 34 is higher than a central portion 35. Similarly, FIG. 8B illustrates the deformable mirror 1 in which the uneven surface 3 of the reference surface substrate 6 is formed in accordance with one of the curves shown in FIG. 7 where the support surface 34 is slightly higher than a central portion 35; and FIG. 8C illustrates the deformable mirror 1 in which the uneven surface 3 of the reference surface substrate 6 is formed in accordance with one of the curves shown in FIG. 7 where the support surface 34 is lower than a central portion 35.

Figure 8B:
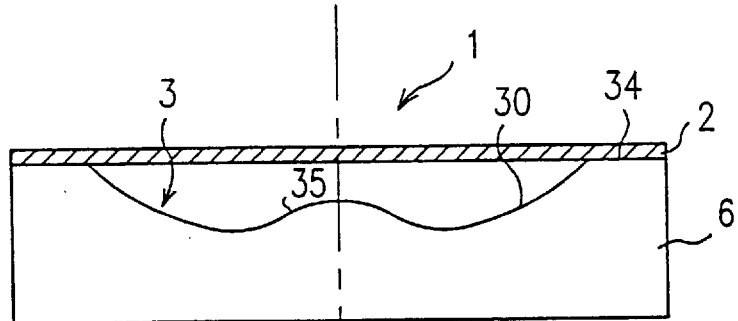
Figure 8C:
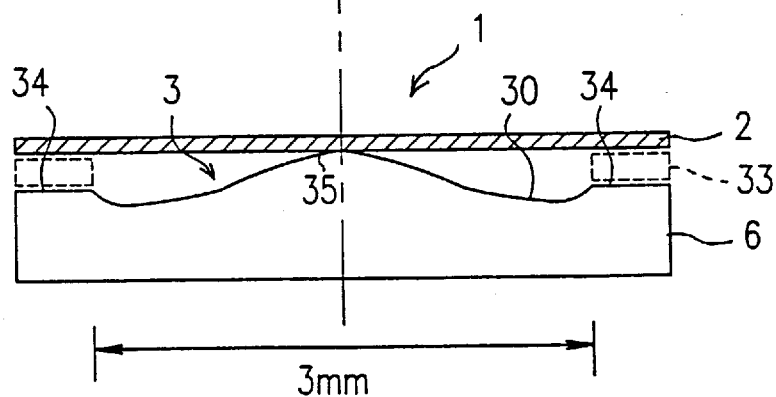
FIG. 8C shows a cross section of another example of a deformable mirror.

Note that the curves illustrated in FIGS. 8A, 8B and 8C respectively correspond to the curves denoted by a, b and c in FIG. 7.

When the uneven surface 3 is formed to have the cross section as shown in FIG. 8A, the flexible member 2 is deformed by a large amount. Thus, a relatively large energy is required for deforming the flexible member 2 and, as a result, the driving voltage which is applied by the driving circuit 7 between the upper electrode layer 8 of the flexible member 2 and the lower electrode layer 12 becomes undesirably large. However, there is no problem in terms of the structure of the deformable mirror 1. That is, there is no problem in terms of the structure for accurately generating a desired aberration.

When the uneven surface 3 is formed to have the cross section as shown in FIG. 8B, the amount of energy required for deforming the flexible member 2 can be reduced by setting the height of the central portion 35 of the uneven surface 3 close to that of the support surface 34. Moreover, there is no problem in terms of the structure. Therefore, this configuration may be ideal.

On the contrary, when the uneven surface 3 is formed to have the cross section as shown in FIG. 8C, it may be undesirable since the central portion 35 of the uneven surface 3 is then higher than the support surface 34, whereby the central portion 35 protrudes upwards beyond the height of the support surface 34 of the flexible member 2. As a result, the reflective surface 10 of the flexible member 2 cannot form and serve as a plane mirror when the flexible member 2 is not being deformed.

In such a case, a spacer 33 may be inserted on the support surface 34 so as to elevate the peripheral portion of flexible member 2, thereby separating the flexible member 2 from the central portion 35. However, when the spacer 33 is inserted, the spacer 33 may apply an additional stress upon the flexible member 2, whereby an accurate generation of the aberration cannot be expected as the flexible member 2 is deformed.

As can be seen from the above discussion, the curve of the cross section of the uneven surface 3 must be selected such that the height of the central portion 35 is identical to or slightly less than that of the support surface 34. In view of this, in the present example, a cross section is selected such that the height of the central portion 35 is identical to or less than that of the support surface 34, whereby the support surface 34 can be in a close contact with the peripheral portion of the flexible member 2.

It is practically preferable that the height of the central portion 35 is at least slightly less than that of the support surface 34 since it is technically demanding to make these heights exactly the same.

Heretofore, the area on the deformable mirror 1 to be irradiated with light beams is entirely and precisely occupied or covered by the reflective surface of the deformable mirror 1 so that the aberration of a light beam is compensated anywhere in this area. However, it is more preferable that the reflective surface of the deformable mirror 1 is made larger than the area to be irradiated with light beams. Such a configuration will be described hereinafter.

In this example, the cross section of the uneven surface 3 is designed so that a predetermined aberration may be generated only within an area which corresponds to the NA of the objective lens 508 (defined by the diaphragm), with the center of the area being the center of the flexible member 2.

That is, the curves illustrated in FIG. 7 are determined based on an assumption that a predetermined aberration be generated in the entire portion of the uneven surface 3. However, it is not necessary to do so but, in fact, the above-described area which corresponds to the NA of the objective lens 508 substantially corresponds to the effective area, where a reliable aberration compensation is needed. Thus, a curved surface of the uneven surface 3 may be such that a predetermined aberration can be generated only within the effective area. In such a case, a portion of the uneven surface 3 outside the area of the curved surface which is designed to generate the predetermined aberration may be of any shape as long as the portion is lower than the support surface 34 of the reference surface substrate 6.

Figure 9:
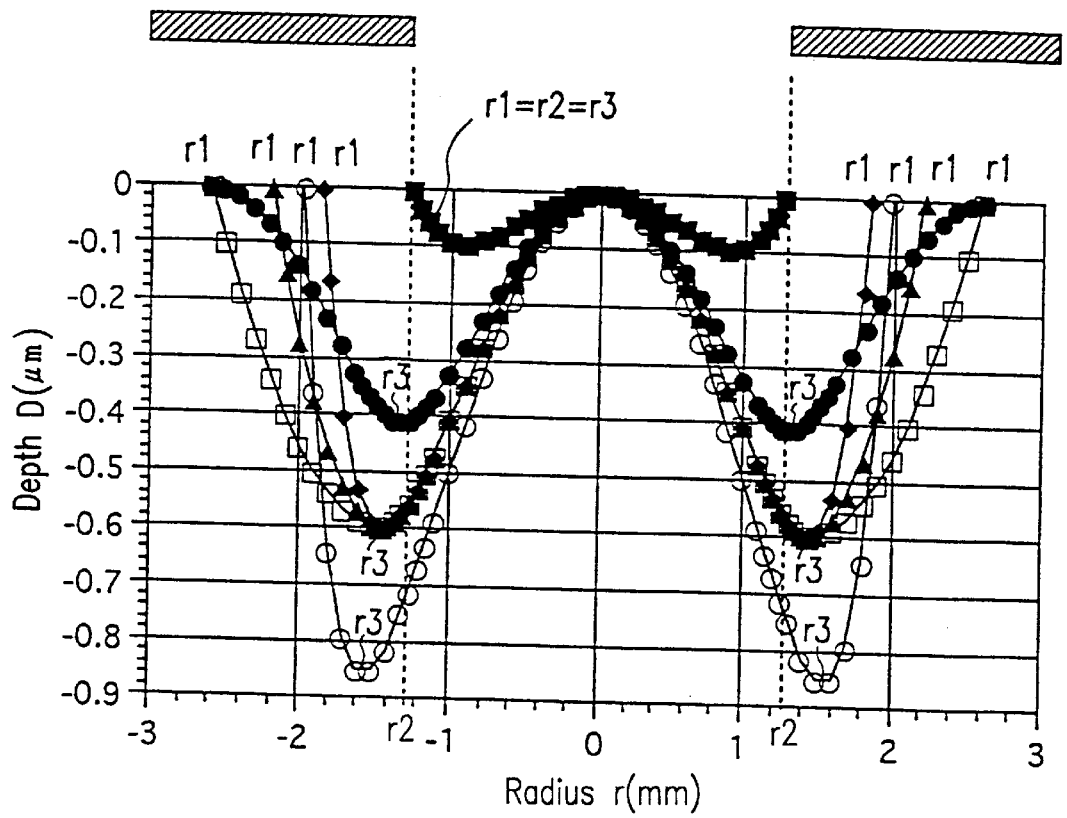
FIG. 9 is a graph illustrating, which illustrates the diaphragm of the objective lens, possible curves for the cross section of the reference surface substrate of the deformable mirror shown in FIG. 1, the curves having been obtained through a simulation.
Figure 9:
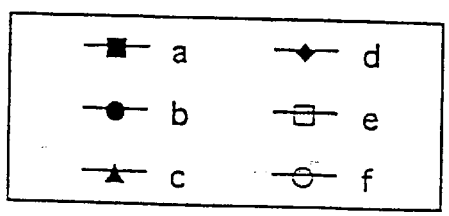

When the objective lens 508 has a focal distance of 3.3 mm, and the effective area is designed to be the area that corresponds to the NA (=0.38) of the objective lens 508 as shown in FIG. 9, such an effective area will be defined by the radius r2=3.3×0.38=1.254 mm. Accordingly, the curved surface has to be designed so that a predetermined aberration for aberration compensation is reliably generated at least in this effective area.

FIG. 9 illustrates, which illustrates the diaphragm of the objective lens 508, cross sections of the uneven surface 3 where the height of the central portion 35 is identical to that of the support surface 34. The illustrated cross sections of the uneven surface 3 are typical ones of those which have been obtained through the above-described simulation.

The legend a in FIG. 9 denotes a cross section where it is assumed that a predetermined aberration is generated in the entire portion of the uneven surface 3. The cross section a corresponds to a portion of the cross section denoted by the legend e in FIG. 7 within the radius r=1.254 mm.

The cross section of the uneven surface 3 denoted by the legend b in FIG. 9 has a curve (a curved surface) which is calculated through a similar simulation as that of FIG. 7 (but not shown in FIG. 7). The curve of the cross section b substantially approximates to a curve existing between the two curves respectively denoted by the legends c and d. Moreover, the cross section b is linearly symmetrical about a symmetry axis extending vertically through the point r3 (1.31 mm from the center), which substantially corresponds to the inflection point of the curve.

The cross section denoted by the legend c in FIG. 9 has a curve which approximates to a curve denoted by the legend d in FIG. 9 from the center to the point r3=1.43 mm, which substantially corresponds to the inflection point of the curve. Within the range from the point r3 to the point r1 (2.2 mm) the curve c has a smooth and continuous arc.

The cross section denoted by the legend d in FIG. 9 has a curve which is calculated through a similar simulation as that of FIG. 7 (but not shown in FIG. 7). The curve d shown in FIG. 9 runs below or deeper than the curve c in FIG. 7.

The cross section denoted by the legend e in FIG. 9 has a curve which approximates to a curve denoted by the legend d in FIG. 9 from the center to the point r3=1.43 mm, which substantially corresponds to the inflection point thereof. Within the range from the point r3 to the point r1 (2.6 mm) the curve e has a smooth and continuous arc.

The cross section denoted by the legend f in FIG. 9 has a curve which is calculated through a similar simulation as that of FIG. 7 (but not shown in FIG. 7). The curve f shown in FIG. 9 runs below or deeper than the curve c or d shown in FIG. 7.

Figure 10A:
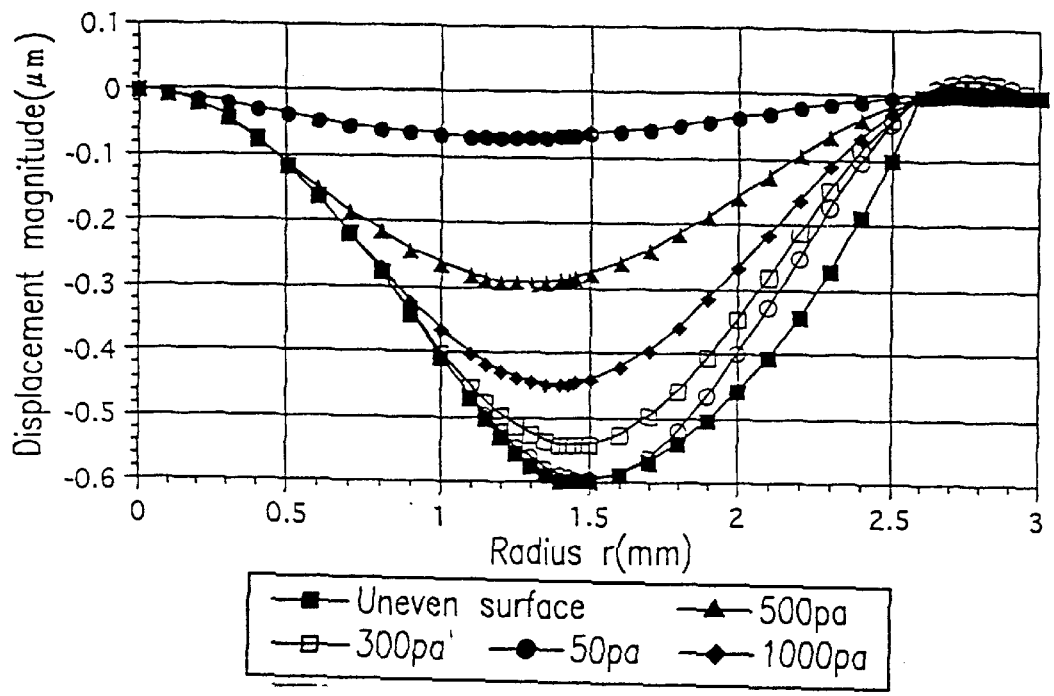
FIG. 10A is a graph showing a simulation result of the displacement magnitude of the flexible member for a cross section of the reference surface substrate of the deformable mirror shown in FIG. 1.
Figure 10B:
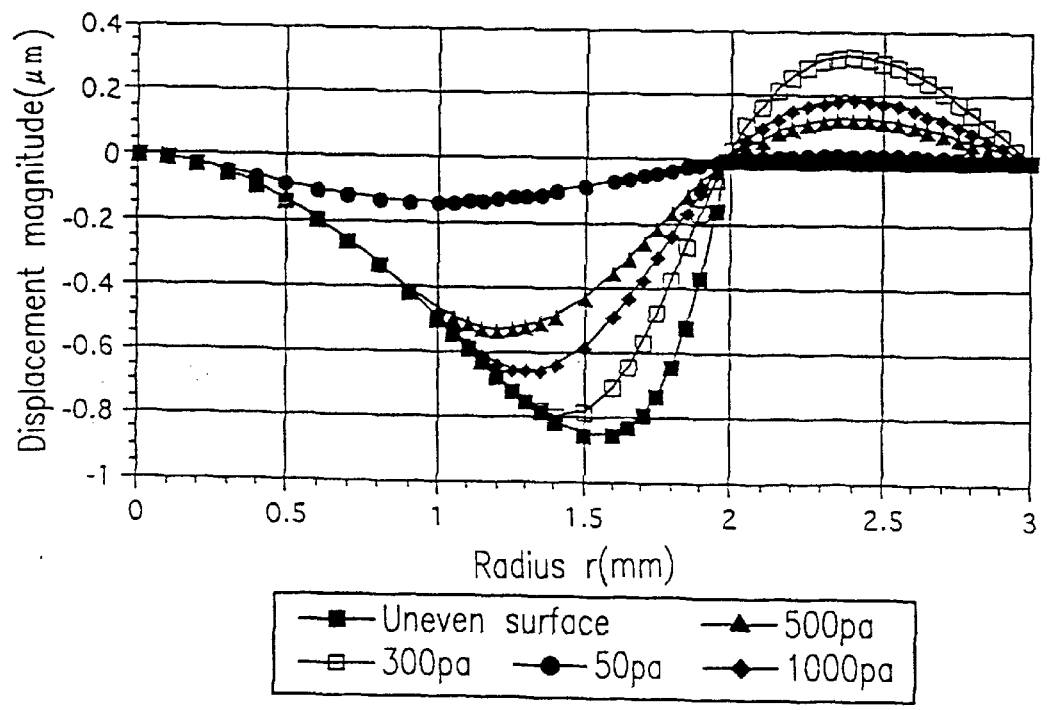
FIG. 10B is a graph showing a simulation result of the displacement magnitude of the flexible member for another cross section of the reference surface substrate of the deformable mirror shown in FIG. 1.

FIGS. 10A and 10B show the displacement magnitude of the flexible member 2, when being deformed by an electrostatic stress, when the uneven surfaces 3 are formed to have the cross sections e and f in FIG. 9, respectively. The displacement magnitude is obtained through a simulation based on the FEM (Finite Element Method). As can be seen from FIGS. 10A and 10B, the flexible member 2 (which deforms in accordance with the uneven surface 3 to generate a predetermined aberration) is satisfactorily drawn toward or in closer contact with the uneven surface 3 in the vicinity of the central portion thereof, but not satisfactorily in the peripheral portion thereof.

Figure 11A:
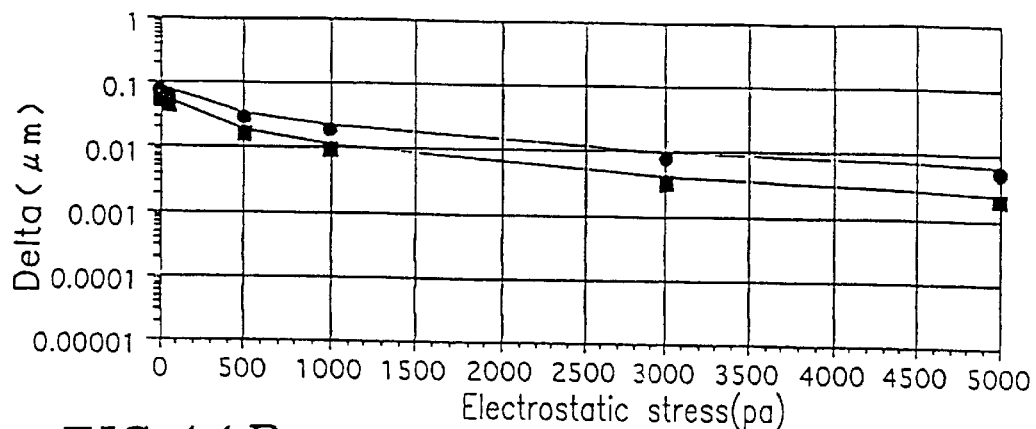
FIGS. 11A, 11B and 11C show the displacement magnitude of the flexible member of the deformable mirror shown in FIG. 1 for different cross sections of the reference surface substrate.
Figure 11B:
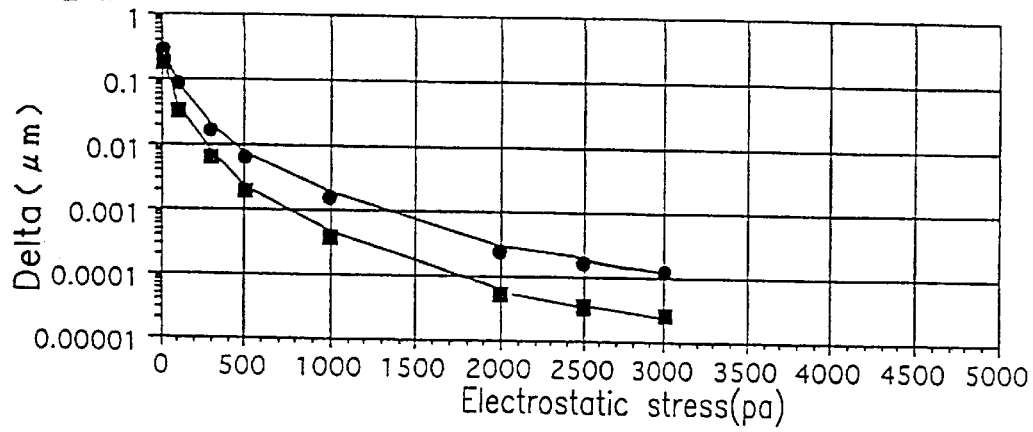
Figure 11C:
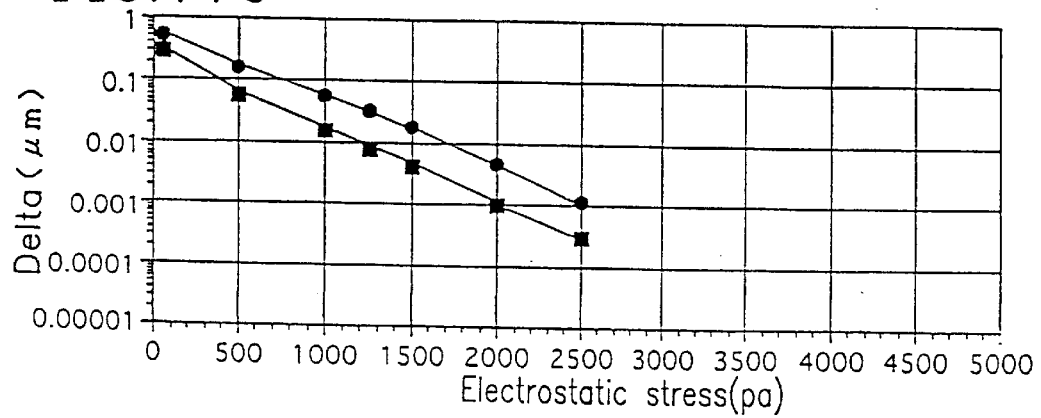
Figure 12A:
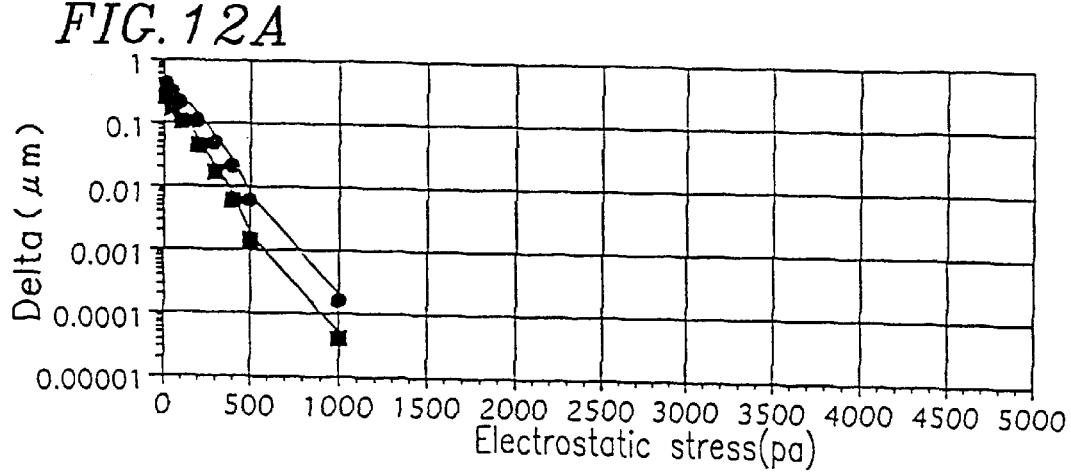
FIGS. 12A, 12B and 12C show the displacement magnitude of the flexible member of the deformable mirror shown in FIG. 1 for different cross sections of the reference surface substrate.
Figure 12B:
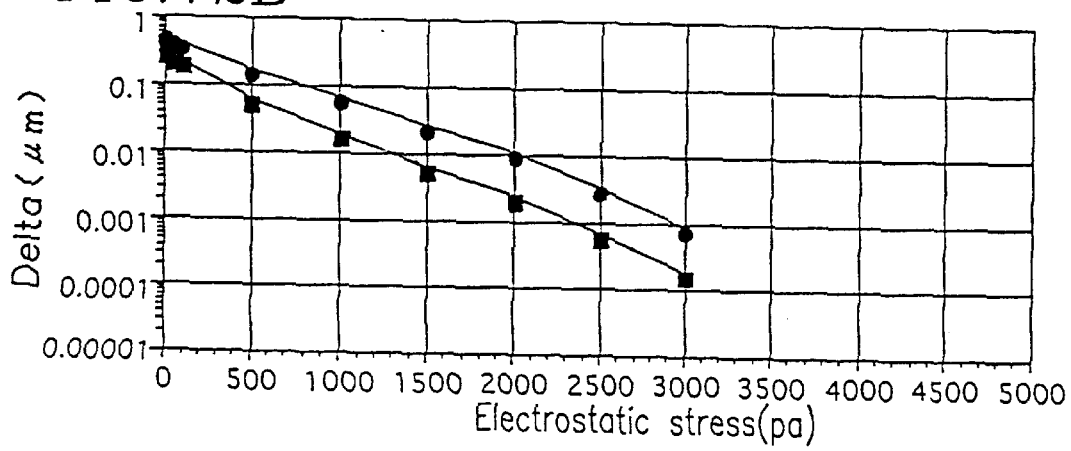
Figure 12C:
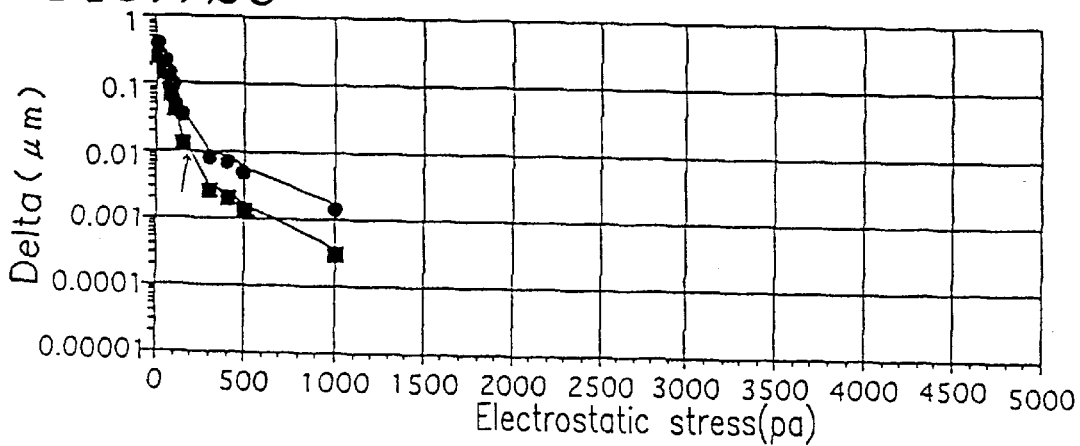

FIGS. 11A, 11B and 11C show the PV value and the rms value for the uneven surfaces 3 which are formed to have the cross sections a, b and c in FIG. 9, respectively. FIGS. 12A, 12B and 12C show the PV value and the rms value for the uneven surfaces 3 which are formed to have the cross sections d, e and f in FIG. 9, respectively. FIGS. 11A, 11B, 11C, 12A, 12B and 12C are plotted by, obtaining the displacement magnitude in response to an electrostatic stress through an FEM simulation as in FIGS. 10A and 10B, and by further calculating the PV value and the rms value for each of the uneven surfaces 3.

The PV value represents the clearance between the flexible member 2 and the uneven surface 3 at a point (within an area where the aberration of a light beam may be compensated by the deformable mirror 1) where the flexible member 2 and the uneven surface 3 are furthest away from each other. The rms value represents the root mean square of the clearance between the flexible member 2 and the uneven surface 3 within the area where the aberration of a light beam may be compensated by the deformable mirror 1. For both the PV value and the rms value, a low value indicates high deformation characteristics. A practical PV value is about 0.08 µm, and a practical rms value is about 0.01 µm.

As can be apparently seen from FIGS. 11A, 11B, 11C, 12A, 12B and 12C, the uneven surface 3 formed to have the curve a shown in FIG. 9, which appears to require only a small displacement magnitude, may not be a desirable choice. The reason for this is that, as shown in FIGS. 10A and 10B, the flexible member 2 of the deformable mirror 1 does not come into a close contact with the uneven surface 3 in the peripheral portion of the uneven surface 3.

Therefore, it is not optimal to determine the uneven surface 3 so that a predetermined aberration may be generated in the entire portion of the uneven surface 3 for compensating the aberration of a light beam. Preferably, the uneven surface 3 is determined while defining an area of the uneven surface 3 from the center thereof to a certain point (e.g., a point corresponding to the NA of the objective lens 508) as the effective area, in which a predetermined aberration is reliably generated. The shape of the peripheral portion of the uneven surface 3 is preferably determined so as to facilitate the deformation of the flexible member 2. In such a case, a reduced amount of energy is required for deforming the flexible member 2.

Based on the simulation results and discussion, in order to realize an accurate aberration compensation while improving the deformation characteristics of the flexible member 2 and lowering the driving voltage of the driving circuit 7, the shape of the uneven surface 3 should be designed as follows. That is, when, as shown in FIG. 9, r1 denotes the radius of an area defined by the periphery or circumference of the uneven surface 3 (this area will be referred to also as the "first region"); r2 denotes the radius of an area of the uneven surface 3, in which a predetermined aberration is reliably generated to compensate the aberration of the light beam (i.e., the radius of the area of the uneven surface 3 which corresponds to the NA of the objective lens 508) (this area will be referred to also as the "second region"); and r3 denotes the radius of an area of the uneven surface 3, which is designed to generate the predetermined aberration (this area will be referred to also as the "third region"), then, the shape of the uneven surface 3 should be designed so as to satisfy Expression (1) below.

$$r1 > r3 > r2 \quad (1)$$

Particularly, when the uneven surface 3 is formed to have the cross section represented by the curve b shown in FIG. 9 (i.e., a curve which is linearly symmetrical about a symmetry axis extending vertically through the point (r1)/2), the flexible member 2 may come into a close contact with the uneven surface 3 in the peripheral portion thereof as well as in the vicinity of the central portion thereof. In such a case, less energy is required for deforming the flexible member 2, as shown in FIG. 11B.

More particularly, the amount of energy (driving voltage) required for deforming the flexible member 2 when the uneven surface 3 is formed to have the cross section b (shown in FIG. 9), is only about ½ of that required when the uneven surface 3 is formed to have the cross section a (shown in FIG. 9). The driving voltage may be calculated from a practical electrostatic stress, which may be selected with reference to the graphs of FIGS. from 11A, 11B, 11C, 12A, 12B and 12C.

Moreover, when the uneven surface 3 is formed to have the cross section c or e shown in FIG. 9 (i.e., when the cross section of the first region of the uneven surface 3 has a smooth and continuous curve, while within the range from the point r3 to the point r1 the cross section of the uneven surface 3 is an arc), the flexible member 2 comes into a close contact with the bottom part of the uneven surface 3.

In such a case, the amount of energy required for deforming the flexible member 2 when the uneven surface 3 is formed to have the cross section c shown in FIG. 9, as compared in the driving voltage, is only about ⅔ of that required when the uneven surface 3 is formed to have the cross section a shown in FIG. 9. Moreover, when the uneven surface 3 is formed to have the cross section e shown in FIG. 9, the amount of energy required for deforming the flexible member 2 is only about ½.2 of that required when the uneven surface 3 is formed to have the cross section a shown in FIG. 9.

The simulation conducted by the inventors of the present invention has confirmed that the deformation characteristics of the flexible member 2 can be improved when the radius of curvature R of the aforementioned arc portion in the vicinity of the point r3 of the cross section c or e shown in FIG. 9 falls within ±20% of the value expressed by Expression (2) below.

$$R = \{(r1-r3)^2 + d^2\}/(2d) \quad (2)$$

How Expression (2) is derived will be described hereinafter with reference to FIG. 13.

Figure 13:
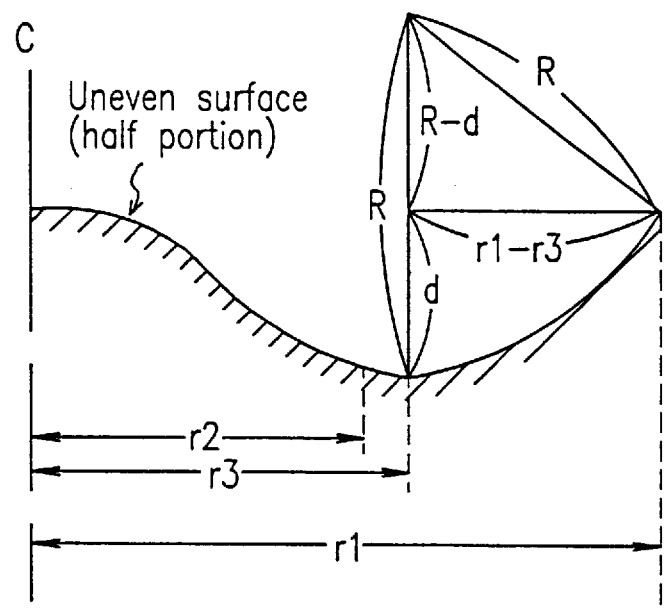
FIG. 13 is a schematic diagram for illustrating how a radius of curvature of an arc portion of a curved surface is derived.

Assume that the curve representing the cross section of the uneven surface 3 be differentiable within the first region of the uneven surface 3, while the curve is an arc in the area that corresponds to the first region excluding the third region, as shown in FIG. 13. That is, assume a curved surface whose cross section is continuous and differentiable at the point r3, while the cross section is deepest at the point r3.

Then, from the geometric relationship as shown in FIG. 13, Expression (3) below holds true.

$$R^2 = (R-d)^2 + (r1-r3)^2 \quad (3)$$

Expression (3) can then be expanded and rearranged with respect to the radius of curvature R to give Expression (2): $R = \{(r1-r3)^2 + d^2\}/(2d)$.

The grounds for setting the tolerance of ±20% is based on the fact that the range of process errors which actually occur is about ±20%.

The deformation characteristics of the flexible member 2 varies depending upon the thickness of the Ni film or the like (of which the flexible member 2 is formed) and the Young's modulus of the material used for the flexible member 2. In view of this, the inventors of the present invention made an experiment on the relationship between the shape of the uneven surface 3 and the thickness and Young's modulus of the flexible member 2.

The experiment has confirmed that, when the thickness of the flexible member 2 and the Young's modulus of the material are fixed, the optimal shape of the uneven surface 3 (to which the flexible member 2 is deformed) is fixed regardless of the material to be used for the flexible member 2.

In the experiment, the uneven surface 3 was formed to have a cross section corresponding to the curve e shown in FIG. 9, and the pressure to be applied was set to about 100 Pa.

Figure 14A:
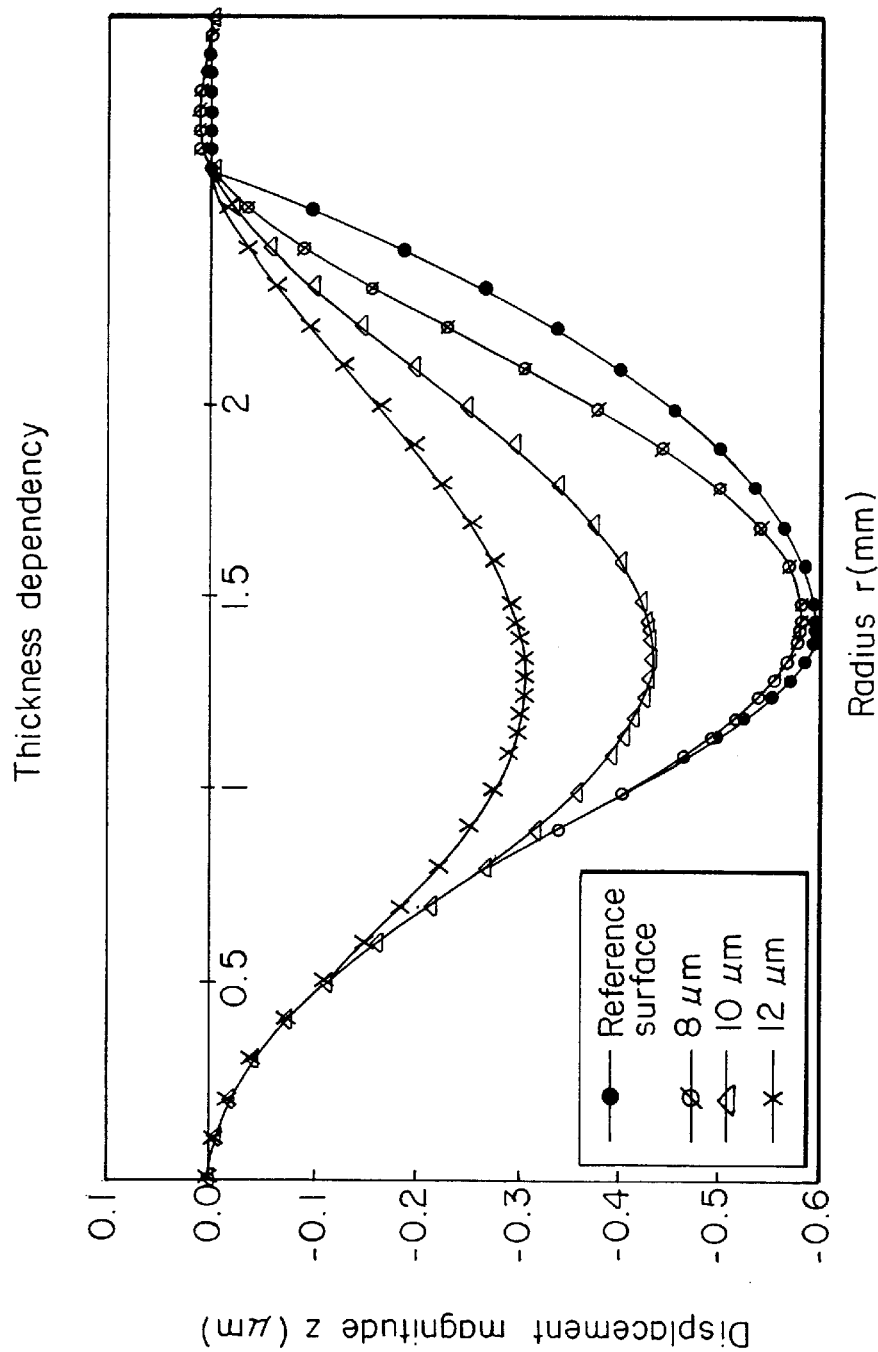
FIG. 14A is a graph illustrating the displacement magnitude of the flexible member of the deformable mirror shown in FIG. 1 for different thicknesses of the flexible member.

Another experiment was conducted to determine the displacement magnitude of the flexible member 2 for different thicknesses of the flexible member 2 while the shape of the uneven surface 3 is fixed. The results are shown in FIG. 14A. This experiment has shown that the thickness of about 10 $\mu$m is preferable.

In the experiment, Ni (Young's modulus: about 210 GPa) was used as the material for the flexible member 2.

Figure 14B:
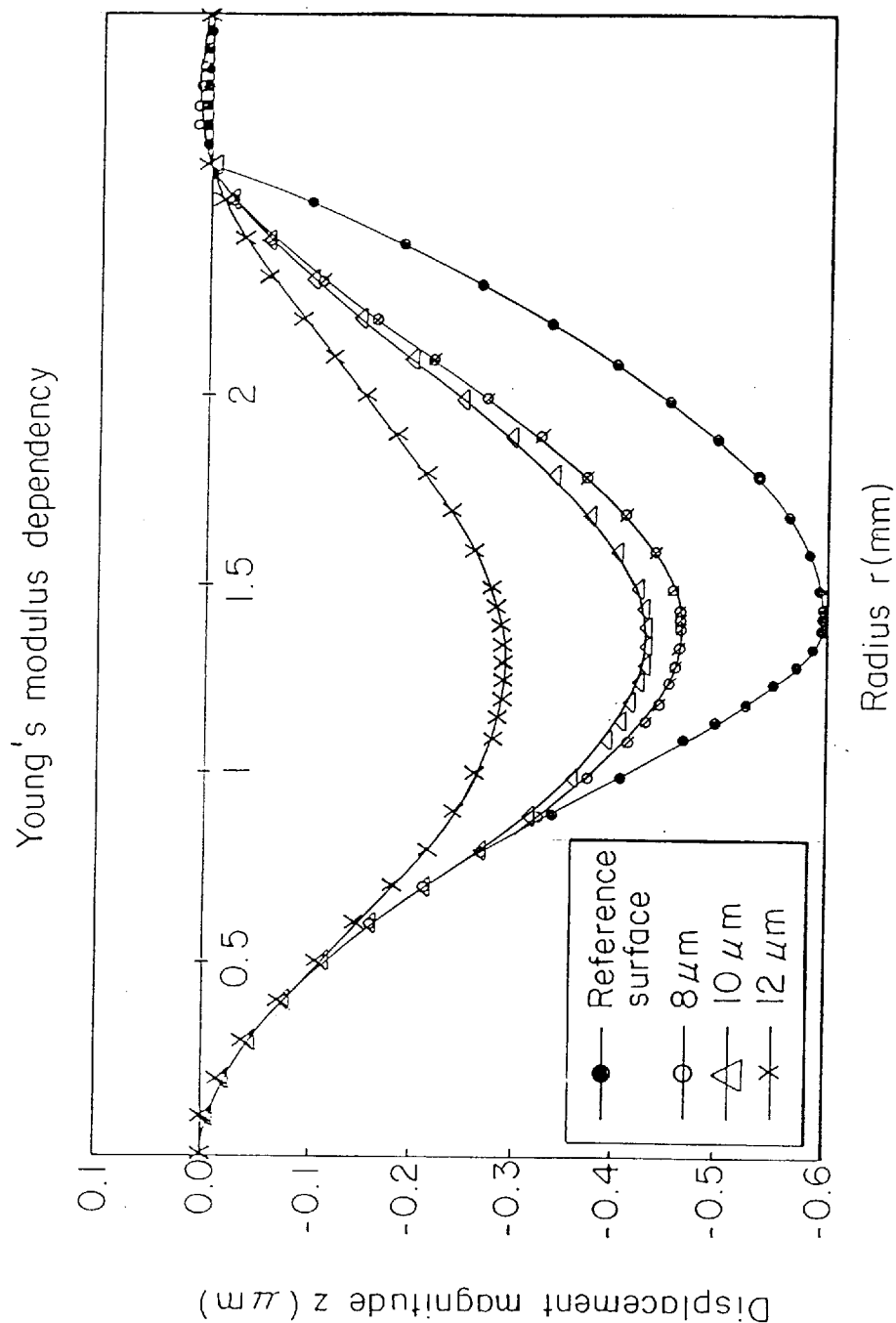
FIG. 14B is a graph illustrating the displacement magnitude of the flexible member of the deformable mirror shown in FIG. 1 for different Young's moduli of the flexible member.
Figure 15:
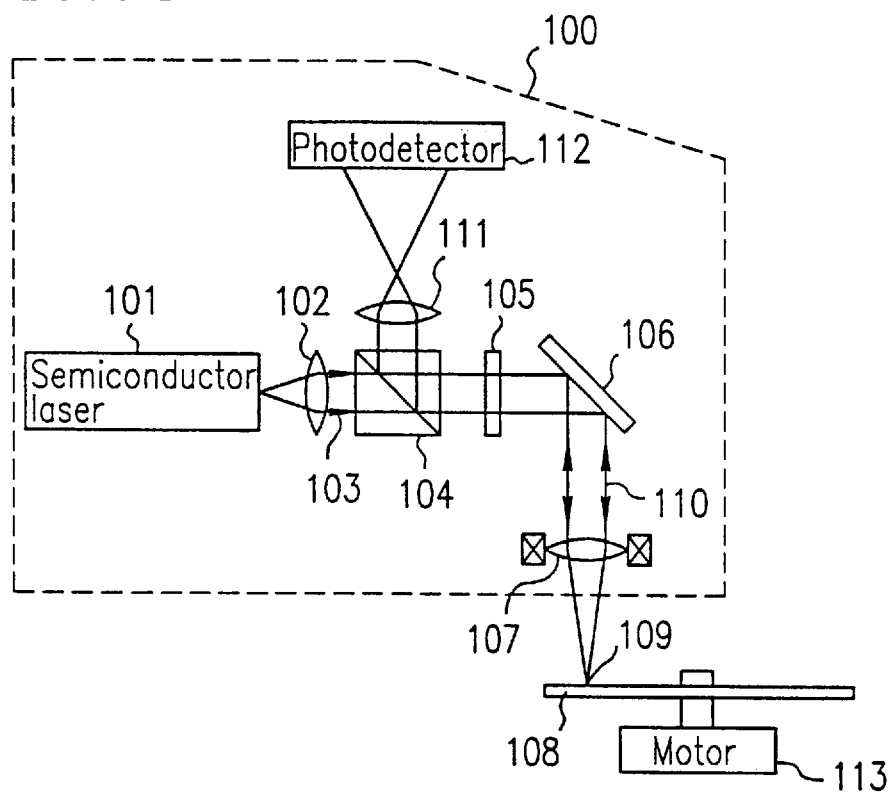
FIG. 15 is a block diagram illustrating a configuration of a conventional optical pickup.
Figure 16:
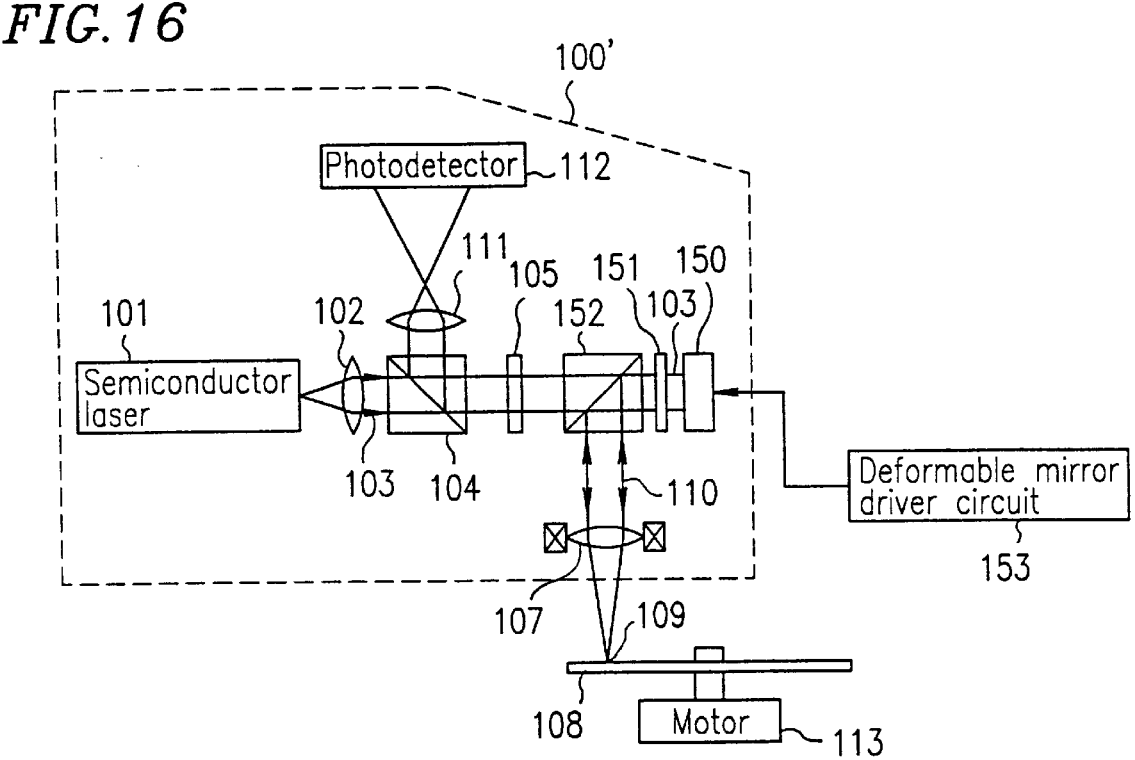
FIG. 16 is a block diagram illustrating a configuration of a conventional optical pickup incorporating a conventional deformable mirror.
Figure 17:
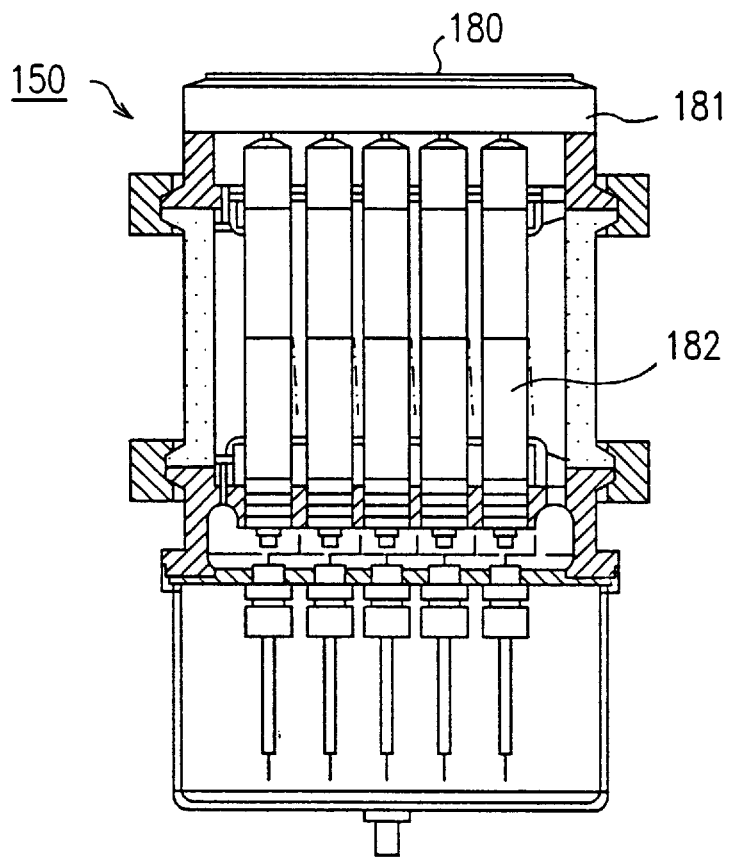
FIG. 17 illustrates a conventional deformable mirror.

Yet another experiment was conducted to determine the displacement magnitude of the flexible member 2 for different Young's moduli of the flexible member 2 while the shape of the uneven surface 3 is fixed. The results are shown in FIG. 14B.

Note that it has been confirmed that Ni or Si is preferable as the material for the flexible member 2 regardless of cross section of the uneven surface 3.

It should be noted that the present invention is not limited to the specific example disclosed herein but, rather, may also be implemented in various other examples. For example, the flexible member 2 may also be formed by coating a conductive layer (to serve as an electrode) or a metal layer (to serve as a reflective layer) over a polymeric material such as a polyimide film. Alternatively, the entire portion of the reference surface substrate 6 may be formed of a conductive material. Moreover, minute holes may be provided in the flexible member 2 as air vent holes.

Furthermore, the uneven surface 3 of the reference surface substrate 6 may include bumps or holes which are so minute that they do not affect at all the shape of the flexible member 2, when being drawn toward the uneven surface 3. However, such minute bumps or holes are not contemplated in the present invention, but the present invention is directed to defining the cross section of the uneven surface 3 by a smooth surface covering the uneven surface 3 of the reference surface substrate 6. Note that, in some cases, such minute bumps or holes may be provided on the uneven surface 3 for releasing the air pressure.

Alternatively, as a method for causing the flexible member 2 to be drawn toward the uneven surface 3 of the reference surface substrate 6, a magnetic body may be provided at least partially in the flexible member 2 so that the flexible member 2 may be drawn toward the reference surface substrate 6 by means of a magnetic force. Moreover, it is also possible to control the air pressure between the flexible member 2 and the uneven surface 3 of the reference surface substrate 6 so as to cause the flexible member 2 to be drawn toward the uneven surface 3 of the reference surface substrate 6.

As is apparent from the above description, in the deformable mirror of the present invention, the reflective surface of the flexible member is deformed in accordance with the cross section of the curved portion of the reference surface substrate. Therefore, by maintaining high form accuracy of the curved portion, the deformed shape of the reflective surface can be accurately determined so that an accurate aberration compensation can be achieved.

The curved portion of the reference surface substrate may be of any shape as long as a predetermined aberration can be compensated. According to the present invention, since the height of the central portion of the cross section of the curved portion is set to be equal to or less than that of the support portion around the central portion, the central portion never protrudes upwards beyond the periphery of the support portion. Therefore, the flexible member does not come into contact with the central portion, so that the reflective surface of the flexible member may form and serve as a plane mirror, when being not deformed. As a result, it is possible to establish both a plane mirror state (for not generating an aberration) and a deformed mirror state (for enabling an aberration compensation). This enables an optical apparatus or a recording/reproducing apparatus incorporating such a deformable mirror to accurately record/reproduce information onto/from two types of optical disks being different from each other in thickness.

Moreover, according to the present invention, the deformable mirror can be elastically deformed by causing the flexible member to be drawn toward the curved portion of the reference surface substrate by applying, for example, some static electricity. Due to such a configuration, unlike the conventional deformable mirror which is driven by means of a plurality of actuators, the uniformity in deforming the flexible member can be maintained against environmental variation and the like. A further advantage of such a configuration is that since the deformable mirror can be driven only by applying a voltage between the flexible member and the curved portion of the reference surface substrate, the driving system, which supplies the voltage, can be simplified.

Furthermore, the amount by which the flexible member is deformed can be reduced when the curved portion of the reference surface substrate is composed of: a central convex portion; a ring-shaped concave portion surrounding the central convex portion; and a transition portion extending from the ring-shaped concave portion to the support portion of the reference surface substrate.

Still furthermore, the peripheral portion of the curved portion present outside the effective portion of the curved portion (in which a predetermined aberration may be generated to compensate the aberration of the light beam) may be shaped so as to facilitate the deformation of the flexible member. Therefore, the amount of energy required for deforming the flexible member can be reduced.

The flexible member of the deformable mirror can be deformed by, for example, providing the flexible member with an upper electrode layer while providing the reference surface substrate with a lower electrode layer, and applying a voltage between the electrodes. Thus, the flexible member is elastically deformed by virtue of the static electricity generated between the electrodes. By shaping the peripheral portion of the flexible member so as to facilitate the deformation, the amount of energy (i.e., voltage) required for elastically deforming the flexible member can be reduced. As a result, the running cost of the optical apparatus or the recording/reproducing apparatus can be reduced.

Moreover, when the deformable mirror is designed so that light is incident thereupon within the second region (defined by the radius r2), the aberration of the incident light is reliably compensated. For example, in an optical apparatus or a recording/reproducing apparatus, when the second region corresponds to the NA of the objective lens, the aberration of the incident light can be reliably compensated.

Furthermore, when the first region of the curved surface of the reference surface substrate is differentiable, the curved surface is smooth and continuous. In such a case, it is possible to improve the deformation characteristics of the flexible member, which is elastically deformed in accordance with the curved surface, while no excessive stress is generated locally when the flexible member is being deformed. Thus, as well as the amount of energy required for elastically deforming the flexible member can be reduced, the life of the flexible member may be prolonged while the reliability of the optical apparatus or the recording/reproducing apparatus may also be enhanced.

Still furthermore, the cross section of the first region (defined by the radius r1) may be linearly symmetrical about a symmetry axis extending vertically through the point (r1)/2 (i.e., the point at a distance of ½ the radius r1 from the center, which is the radius of the periphery of the curved portion). In such a case, the flexible member can be deformed smoothly. As a result, when such a deformable mirror is incorporated into an optical apparatus or a recording/reproducing apparatus, the running cost thereof can be reduced.

Still furthermore, the cross section of the curved surface may be differentiable at the point r3, while the cross section of the curved surface in the area that corresponds to the first region excluding the third region is an arc. Also in such a case, the flexible member can be deformed smoothly while no excessive stress is generated locally when the flexible member is being deformed. Moreover, the radius of curvature R of the cross section of the first region (defined by the radius r1) preferably falls within ±20% of the value expressed by Expression (2) above. In such a case, such a deformable mirror, when incorporated into an optical apparatus or a recording/reproducing apparatus, may contribute to reducing the running cost of the apparatus.

Still furthermore, when the flexible member is formed of a material containing at least one of Ni and Si, the deformation characteristics of the flexible member are improved. Such a deformable mirror can also be incorporated into an optical apparatus or a recording/reproducing apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A deformable mirror comprising:
    a flexible member including a reflective surface for reflecting light incident thereupon; and
    a reference surface substrate including
        a support portion for supporting a peripheral portion of the flexible member, and
        a curved portion provided inside the support portion, the curved portion providing a space for allowing for the flexible member to be elastically deformed, wherein:
            a central convex portion of the curved portion projects toward the flexible member, a height of the projecting central convex portion of the curved portion of the reference surface substrate is set to be equal to or less than a height of the support portion of the reference surface substrate; and
        the flexible member having the physical property of being elastically deformable so that it can be drawn toward the curved portion of the reference surface substrate, thereby giving a predetermined aberration to light incident upon the reflective surface of the flexible member.

2. The deformable mirror according to claim 1, wherein the curved portion of the reference surface substrate includes:
    a central convex portion provided around a center of the curved portion;
    a ring-shaped concave portion surrounding the central convex portion; and
    a transition portion extending from the ring-shaped concave portion to the support portion of the reference surface substrate.

3. The deformable mirror according to claim 1, wherein,
    when r1 denotes a radius of a first region of the curved portion which corresponds to a periphery of the curved portion,
    r2 denotes a radius of a second region of the curved portion in which, as the flexible member is being drawn toward the curved portion, a predetermined aberration is reliably given to light incident upon the reflective surface of the flexible member, and
    r3 denotes a radius of a third region of the curved portion which is designed to, as the flexible member is being drawn toward the curved portion, give the predetermined aberration to light incident upon the reflective surface of the flexible member, then,
    Expression (1): r1>r3>r2 is satisfied.

4. The deformable mirror according to claim 3, wherein the first region of the curved portion is differentiable.

5. The deformable mirror according to claim 3, wherein a cross section of the first region of the curved portion is linearly symmetrical about a symmetry axis extending vertically through a point at a distance of (r1)/2 from a center of the curved portion.

6. A deformable mirror according to claim 3, wherein:
    a cross section of the first region of the curved portion excluding the third region is differentiable; and
    the cross section of the first region is an arc.

7. The deformable mirror according to claim 3, wherein a cross section of the first region of the curved portion has a radius of curvature R which falls within ±20% of a value expressed by Expression (2)

$$R=\{(r1-r3)^2+d^2\}/(2d) \qquad (2),$$

where d denotes a depth of the curved portion at its deepest point.

8. A deformable mirror according to claim 1, wherein the flexible member is formed of a material containing at least one of Ni and Si.

9. The deformable mirror according to claim 1, further including means for deforming the flexible member.

10. An optical apparatus comprising:
    a deformable mirror including a deformable reflective surface; and
    an optical element for inputting/outputting to/from the deformable mirror, the optical apparatus generating optically different light beams depending upon whether the deformable mirror is being deformed or not, wherein:
    the deformable mirror includes:
        a flexible member including a reflective surface for reflecting light incident thereupon; and
        a reference surface substrate including a support portion for supporting a peripheral portion of the flexible member, and a curved portion provided inside the support portion, the curved portion providing a space for allowing for the flexible member to be elastically deformed, wherein:

- a central convex portion of the curved portion projects toward the flexible member, a height of the projecting central convex portion of the curved portion of the reference surface substrate is set to be equal to or less than a height of the support portion of the reference surface substrate; and

- the flexible member having the physical property of being elastically deformable so that it can be drawn toward the curved portion of the reference surface substrate, thereby giving a predetermined aberration to light incident upon the reflective surface of the flexible member.

11. The deformable mirror according to claim 10, further including means for deforming the flexible member.

12. A recording/reproducing apparatus comprising:

a laser light source;

a deformable mirror including a reflective surface for reflecting laser light from the laser light source, the deformable mirror giving a spherical aberration to the laser light by deforming the reflective surface;

an objective lens for focusing the laser light reflected by the deformable mirror onto either one of first and second optical recording media which are different from each other in thickness; and a driver for deforming the reflective surface of the flexible member, wherein;

the driver does not deform the reflective surface of the flexible member when the laser light is to be focused onto the first optical recording medium;

the driver deforms the reflective surface of the flexible member when the laser light is to be focused onto the second optical recording medium; and the deformable mirror includes:

a flexible member including a reflective surface for reflecting light incident thereupon; and a reference surface substrate including a support portion for supporting a peripheral portion of the flexible member, and a curved portion provided inside the support portion, the curved portion providing a space for allowing for the flexible member to he elastically deformed, wherein:

- a central convex portion of the curved portion protects toward the flexible member, a height of the projecting central convex portion of the curved portion of the reference surface substrate is set to be equal to or less than a height of the support portion of the reference surface substrate; and

- the flexible member having the physical property of being elastically deformable so that it can be drawn toward the curved portion of the reference surface substrate, thereby giving a predetermined aberration to light incident upon the reflective surface of the flexible member.

13. The deformable mirror according to claim 12, further including means for deforming the flexible member.

* * * * *